United States Patent [19]

Tsukahara et al.

[11] Patent Number: 5,124,735
[45] Date of Patent: Jun. 23, 1992

[54] ELECTROMOTIVE CAMERA EQUIPPED WITH DATA PHOTOGRAPHING DEVICE

[75] Inventors: Daiki Tsukahara, Kawasaki; Hideya Inoue, Yokohama, both of Japan

[73] Assignee: Nikon Corporation, Tokyo, Japan

[21] Appl. No.: 582,784

[22] Filed: Sep. 14, 1990

Related U.S. Application Data

[63] Continuation of Ser. No. 439,587, Nov. 21, 1989, abandoned.

[51] Int. Cl.⁵ .............................................. G03B 17/24
[52] U.S. Cl. .............................................. 354/106
[58] Field of Search ................ 354/105, 106, 109, 219

[56] References Cited

U.S. PATENT DOCUMENTS

| 4,198,146 | 4/1980 | Taniguchi et al. ................ 354/106 |
| 4,344,682 | 8/1982 | Hattori .............................. 354/106 |

FOREIGN PATENT DOCUMENTS 50-151229  5/1974  Japan .
54-101314  8/1979  Japan .
1-246533  10/1989  Japan .

*Primary Examiner*—Brian W. Brown
*Assistant Examiner*—Khanh Dang
*Attorney, Agent, or Firm*—Shapiro and Shapiro

[57] ABSTRACT

A camera is capable of recording plural kinds of data at corresponding positions of each film frame. In a first operating mode a first kind of data is recorded at a first position in the film frame disposed at an exposure location, and film feeding is started. Film feeding is suspended temporarily, and a second kind of data is recorded at a second position of the frame. Then film feeding continues to bring a subsequent frame to the exposure location. If no second kind of data is to be recorded or if no data of any kind is to be recorded, the film feeding is not temporarily suspended. Data recording may occur in the course of film winding or film rewinding. Some or all of the data may be stored before recording, and the order of the recording of kinds of data may be changed, e.g., at the last frame of the film. In some embodiments the film is rewound by a fraction of a frame before recording of a second kind of data.

10 Claims, 20 Drawing Sheets

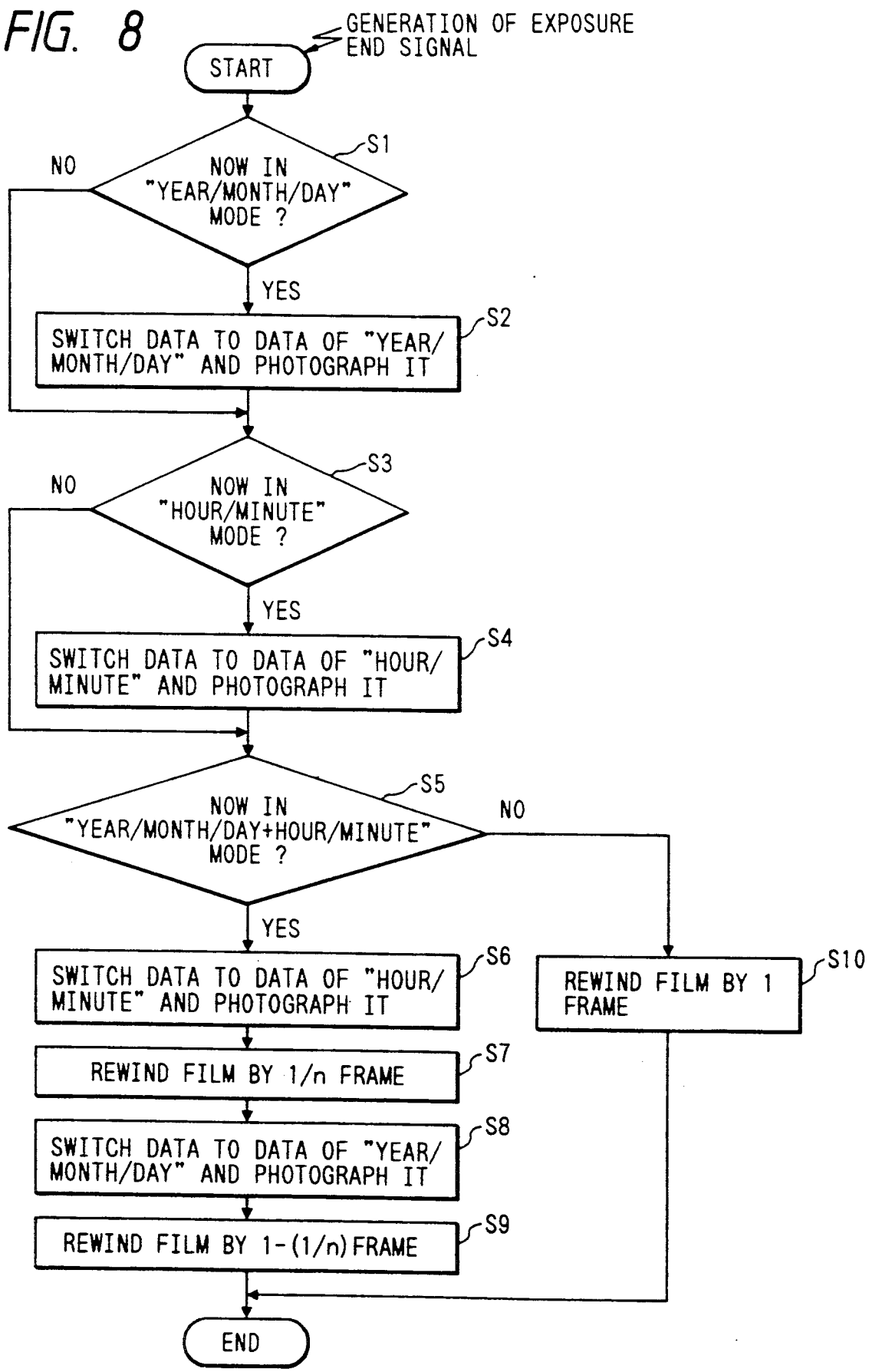

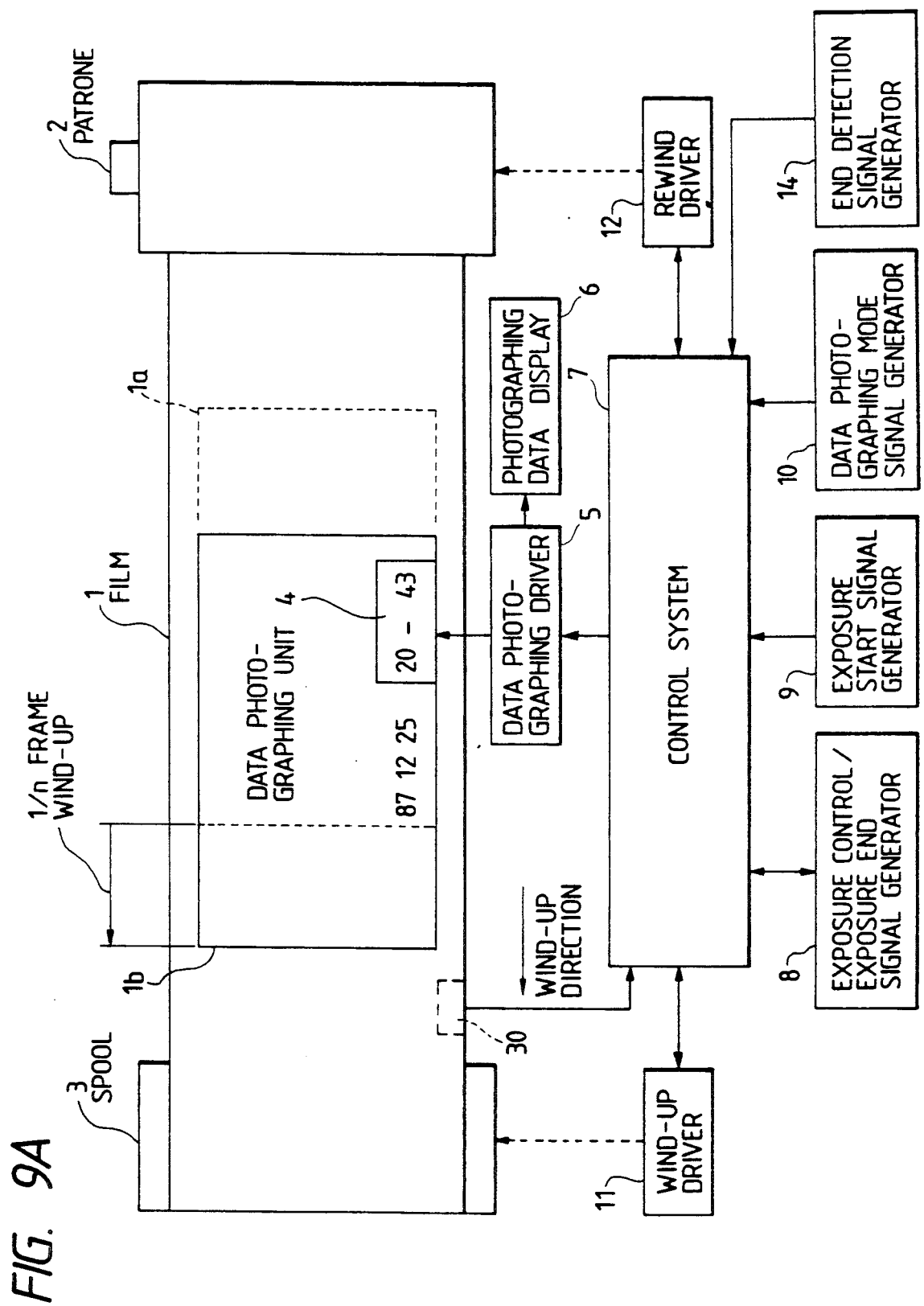

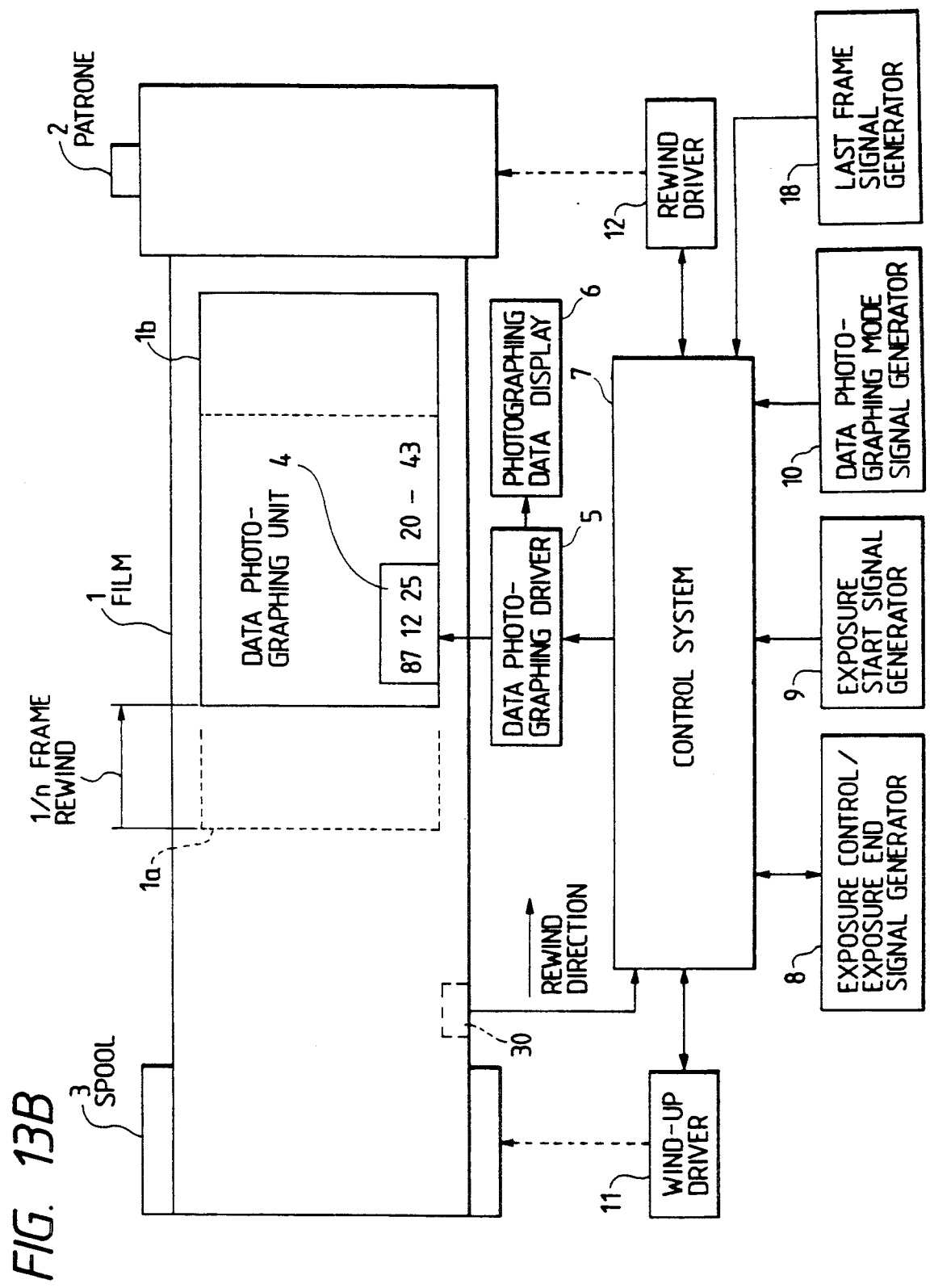

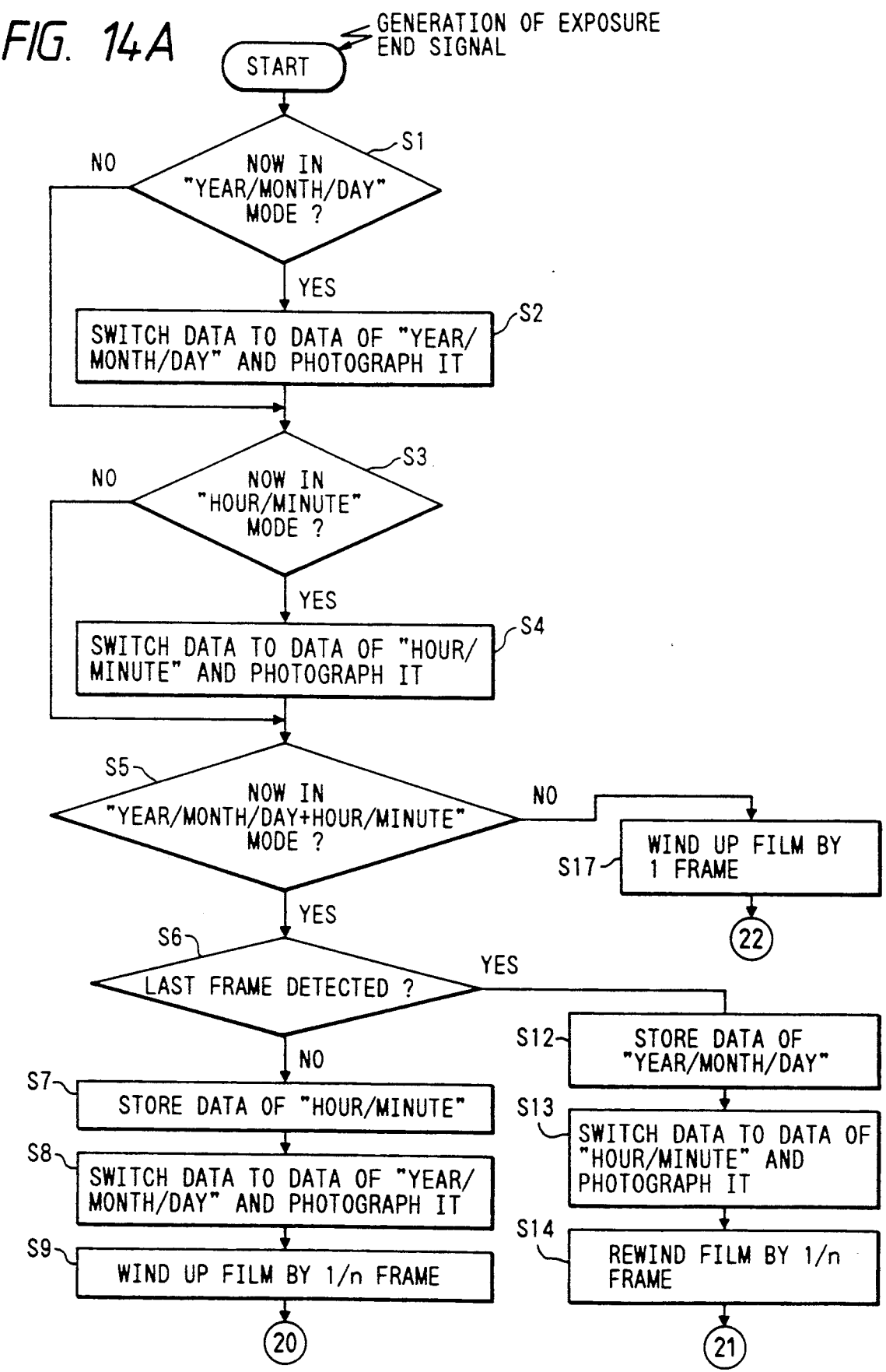

ELECTROMOTIVE CAMERA EQUIPPED WITH DATA PHOTOGRAPHING DEVICE

This is a continuation of application Ser. No. 439,587 filed Nov. 21, 1989, now abandoned.

BACKGROUND OF THE INVENTION

1. Field of the Invention

The present invention relates to a camera with a data photographing device which selectively photographs plural kinds of data each comprising plural digits of numerals and/or characters, such as "year/month/day" and "hour/minute", on respective frames of a film in sequence when exposed for taking shots.

2. Related Background Art

In data photographing devices of commercially available cameras, it is conventional that when a data photographing mode is selected, data of "year/month/day" or "hour/minute" selected in advance by a photographer is read from an electronic clock including a clock pulse source such as a crystal oscillator, and then photographed on a film when exposed for taking shots. This permits the data of "year/month/day" or "hour/minute" to be indicated by numerical values on each of photoprints, so that the shooting data or time can be confirmed upon those photoprints being looked at later. Using that data makes it easy to rearrange or put in order the photoprints.

There are so far known two types of data photographing devices for commercially available cameras. One type device includes a data photographing unit which comprises liquid crystal indicator elements or the like able to indicate the data such as "year/month/day" all together, whereby the data is photographed on a film at a time while the film is at the same rest for taking a shot. The other type device includes a plurality of light emitting elements arrayed into a line perpendicular to the feeding direction of a film, those light emitting elements being so controlled synchronously with feeding of the film as to photograph the data on the film being fed.

The former type device requires only control of the indicator elements, and hence has an advantage of simplified construction of the device. However, restrictions on the number of digits for numerals and/or characters which can be indicated by the data photographing unit, necessarily reduce an amount of data capable of being photographed at the same time. For example, it is therefore impossible to photograph both "year/month/day" and "hour/minute" simultaneously. Usually, either kind of data is selected by a photographer to be photographed.

The latter type device enables the whole of each frame of a film to be employed as a data photographing region, thereby allowing simultaneous insertion of both "year/month/day" and "hour/minute". However, since the light emitting elements have to be controlled synchronously with feeding of the film, the device requires an encoder for precisely sensing a fed amount of the film and a circuit for converting the photographed data to dot line data, thus resulting in complicated construction and the increased cost of the device.

Related Japanese and United States Patent Applications are as follows.

Japanese utility Model Laid-Open No. 50(1975)-151229 discloses a technique of photographing plural characters on each frame of a film with constant spacings between those characters, by using a single light emitting element capable of indicating one digit (one character) which is energized to cyclically emit light, while feeding the film at a constant speed. Also described in that Japanese Utility Model Laid-Open Publication is "the film may be stopped in synchronous relation whenever the light emitting element is energized to emit light". But, the above Japanese utility Model Laid-Open Publication illustrates only the film, the light emitting element, and a lens disposed between the former two, but does not particularly refer to a manner in which feeding of the film and light emission from the light emitting element are to be controlled.

U.S. Pat. No. 4,198,146 discloses two types of data photographing devices. The first type device has a photographing unit able to selectively indicate the data of "year/month/day" or "month/day/hour/minute" in one lot, so that preselected data either of "year/month/day" or "month/day/hour/minute" may be photographed on each frame of a film at a predetermined position by using the photographing unit. Thus, the data photographing device of the first type disclosed in that U.S. Patent cannot photograph two kinds of data on the same frame of the film.

The second type device has a photographing unit able to selectively indicate the data of "month/day", "year" or "hour/minute" in one lot. After indicating the data of "month/day" in the photographing device to photograph that data on one frame of a film at a first position, a rotatable mirror disposed between the photographing device and the film is driven to change an optical path of data extending from the photographing unit. Then, by indicating data either of "year" or "hour/minute" in the photographing device, that data is photographed on the same frame of the film at a second position (different from the first position) Which one of "year" or "hour/minute" is to be photographed after the data of "month/day" is selected in advance by actuating a selector switch. This data photographing device of the second type can photograph two kinds of data on the same frame of the film by the single photographing unit. In return for that capability, however, it requires the rotatable mirror for changing the optical path of data and a driver for rotating the mirror. Thus, the camera mounting thereon the data photographing device of the second type is increased in its overall size. Further, the data photographing device of the second type makes it possible to always photograph two kinds of data on the same frame, but not to photograph one kind of data alone. In addition, whenever the data is photographed, the mirror has to be driven for photographing the second data ("year" or "hour/minute"). Feeding of the film to be ready for the next shot cannot be started until the second data has completely been photographed after driving the mirror. This prolongs a period of time required for preparing the next shot.

Japanese Patent Laid-Open No. 54(1979)-101314 discloses three types of data photographing devices. The first type device is similar to the data photographing device of the first type as disclosed in the above U.S. Pat. No. 4,198,146 as to selectively photographing the data of "year/month/day" or "hour/minute/second" (by selecting either one of them). This first type device cannot photograph two kinds of data on the same frame of a film.

The second type device is able to photograph both the data of "hour/minute/second" and "year/month/day" on the same frame of the film in order by using a single data photographing unit. With this second type device, in interlock relation with a depressed stroke of a release button to release a shutter, the data of "hour/minute/second" is indicated in the data photographing unit for being photographed on one frame of the film at a first position. Then, a lens supported between the data photographing unit and the film in a manner to pivot is swung in interlock relation with a return stroke of the release button, so that the data of "year/month/day" is photographed on the same frame of the film at a second position. As with the above prior art, although this data photographing device of the second type can photograph two kinds of data on the same frame of the film by the single photographing unit, it requires the lens for changing an optical path of data and a driver for swinging the lens. Thus, the camera mounting thereon this data photographing device of the second type is increased in its overall size. Further, this data photographing device of the second type also makes it possible to always photograph two kinds of data on the same frame, but not to photograph one kind of data alone. In addition, the need of swinging the lens to change over the optical path of data upon the reciprocal movement of the release button in turn requires increasing the movement stroke of the release button. Another problem in this second type device is as follows. The depressed position of the release button enough to photograph the first data (i.e., data of "hour/minute/second") is shallower than the depressed position of the release button enough to release the shutter. Therefore, if a photographer's finger is detached from the release button immediately after photographing of the data of "hour/minute/second", the shutter is left not released and, that is, exposure for taking a shot remains not triggered, thereby resulting in a frame of the film on which only the data of "hour/minute/second" has been photographed. Repeating the above process would photograph different data of "hour/minute/second" on the same frame in overlapped relation.

The third type device is also able to photograph both the data of "hour/minute/second" and "year/month/day", on the same frame of the film in order by using a single data photographing unit. But it is different from the second type device in that both the data are photographed in order while feeding a cut-sheet like film from its container. More specifically, the third type device has a claw which is movable straight-forward to feed the film out of the container after photo-taking a picture. The claw is provided with two projections spaced from each other in the direction of movement of the claw. During the moving process, these projections successively strike against a switch adapted to specify the timing of data photographing. In an initial stage just after the claw starts moving, the first projection strikes against the switch to turn it on, whereby the data of "hour/minute/second" is photographed on the film at a first position. Afterward, the claw continues to move without stopping and the second projection now strikes against the switch to turn it on, whereby the data of "year/month/day" is photographed on the film at a second position. Even after that, the claw still continues to move for discharging the film out of the container. This data photographing device of the third type also makes it possible to always photograph two kinds of data on the same frame, but not to photograph one kind of data alone. Further, since the two kinds of data are photographed while moving the film, it is required to lower a feed speed of the film or to increase the intensity of light emitted from the data photographing unit thereby to shorten a data photographing time, for ensuring clearness of the photographed data. Moreover, the successive photographing of the two kinds of data additionally needs to provide the two projections and the switch turned on by the projections, whereby the construction is more complicated.

Regarding data photographing devices among the known various data photographing devices as mentioned above which successively photograph the two kinds of data, variable with the elapse of time, on the same frame of the film, there is a fear that the photographed data may be largely different from the actual time point of taking the shot, because of some time interval between the time point of reading the first photographed data from the electronic clock and the time point of reading the second photographed data from the electronic clock, if those time points of reading the first and second data are just set apart from each other across the turn of a year, month, day or hour. For example, assuming in the device of successively photographing the two data of "month/day" and "year" or the two data of "month/day" and "hour/minute" as disclosed in the above U.S. Pat. No. 4,198,146 that the first data of "month/day" is read from the electronic clock at the time point of 23:59:59 on Dec. 31, 1989 and the second data of "year" or "hour/minute" is read from the electronic clock at the time point of 0:0:0 on Jan. 1, 1990, the data of "month/day", "year" and "hour/minute" would be "12 31", "90" and "0, 0", respectively. Accordingly, if the data of "month/day" and "year" are photographed successively, there would occur a shift of a whole year from the actual time point of taking the shot. If the data of "month/day" and "hour/minute" are photographed successively, there would occur a shift of a whole day, i.e., 24 hours, from the actual time point of taking the shot. A similar problem is encountered in the above device of Japanese Patent Laid-Open No. 54(1979)-101314 as well.

SUMMARY OF THE INVENTION

It is an object of the present invention to provide a device for clearly photographing at least two kinds of data in order on the same frame of a film at different positions by a single data photographing unit, with a simplified construction.

To this end, in accordance with the present invention, first data is photographed upon exposure of the associated frame. Then, the frame of the film to be next exposed starts moving for being fed up to a position ready for exposure. During this course, the feeding of the film is temporarily suspended when the film has been moved by a predetermined amount of distance, thereby for photographing the second data there. On this occasion, means for detecting a fed amount of the film, which is used for feeding the frame of the film to be next exposed up to a position ready for exposure, is also commonly used to detect a fed amount of the film for temporarily suspending the film.

Another object of the present invention is to provide a data photographing device which can selectively photograph plural kinds or only one kind of data or no data by using a single data photographing unit, and which can greatly shorten a period of time required to be ready for taking a shot when only one kind of data or no data is photographed as compared with a period of time required for photographing plural kinds of data.

To this end, in accordance with the present invention, when a mode of photographing plural kinds of data is selected, the feeding of the film started after the completion of photographing the first data is temporarily suspended midway for photographing the next data. But, when a mode of photographing one kind of data or a mode of photographing no data is selected, the above feeding of the film is not suspended midway.

Still another object of the present invention is to provide a data photographing device in which any time point indicated by the photographed data is always coincident with the actual time point of phototaking a picture, when plural kinds of data variable with the elapse of time are photographed in order by a single data photographing unit upon photo-taking.

To this end, in accordance with the present invention, the plural kinds of data are read from an electronic clock substantially at the same time and then stored upon photo-taking a picture. The stored data are sequentially read out to be photographed.

Still another object of the present invention is to provide a data photographing device which can photograph all the plural kinds of data even when the film is brought to come to the end.

To achieve the above object, the present data photographing device adopts the so-called pre-winding technique in which all frames of a film are once wound up previously and the film is rewound into a Patrone on the basis of frame by frame for the completion of each exposure. The rewinding of the film for each frame is temporarily suspended midway to photograph the second data.

Alternatively, to achieve the same object, the device of the present invention photographs the second data after rewinding the film by a predetermined amount of distance, and then winds up the film until the frame to be next exposed reaches an exposure position.

In addition, to achieve the same object and shorten a period of time required to be ready for taking a next shot, the second data is photographed by temporarily suspending the wind-up of the film before the film reaches the end. Upon reaching the film end, the second data is photographed after winding back the film.

BRIEF DESCRIPTION OF THE DRAWINGS

FIG. 8 is a flowchart showing the data photographing control in the embodiment of FIG. 7.

FIGS. 9A and 9B are block diagrams showing another embodiment of the present invention.

FIGS. 13A and 13B are block diagrams showing another embodiment of the present invention.

FIGS. 14A and 14B are flowcharts showing the data photographing control in the embodiment of FIGS. 13A and 13B.

DETAILED DESCRIPTION OF THE PREFERRED EMBODIMENTS

Figure 1:
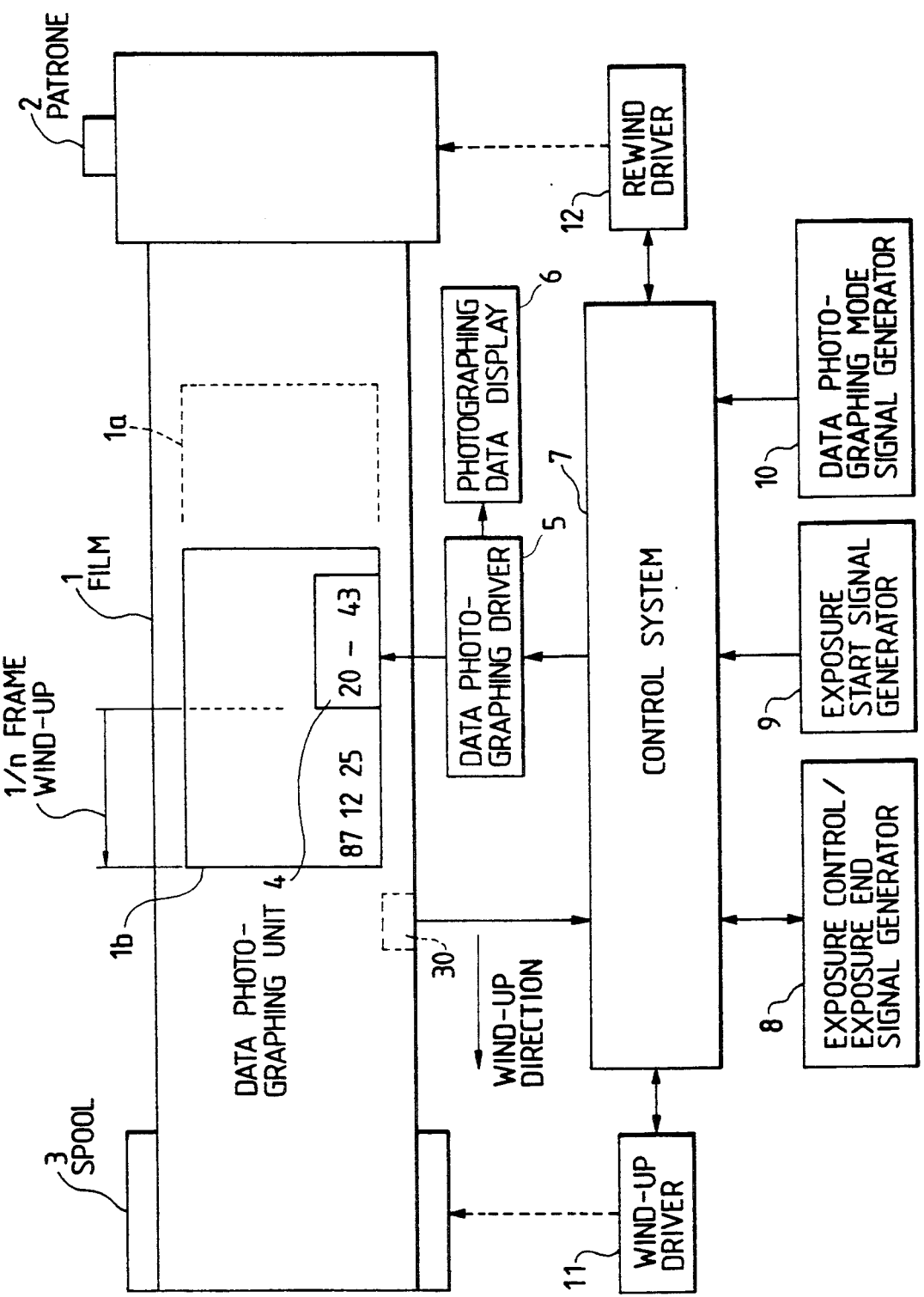
FIG. 1 is a block diagram showing one embodiment of the present invention.

FIG. 1 is a block diagram showing one embodiment of the present invention.

Referring to FIG. 1, designated by the reference numeral 1 is a film shown in a state under photographing in which the film is drawn out of a Patrone (or cartridge) 2 and wound up on a spool 3 by a distance corresponding to several frames.

Figure 2:
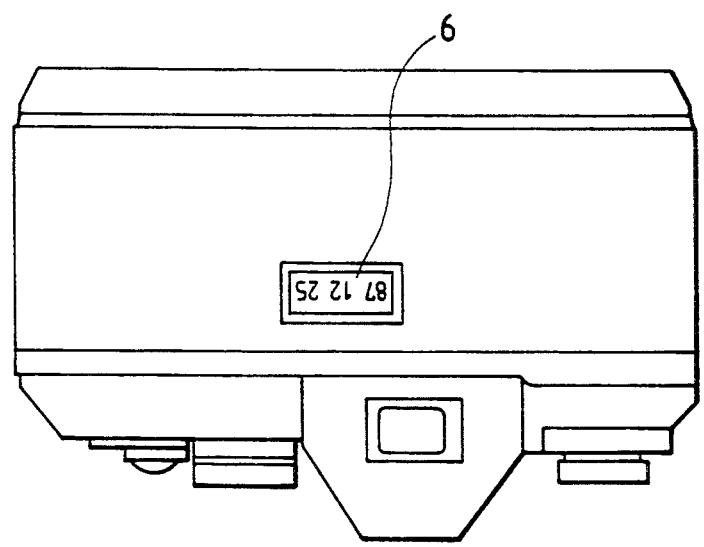
FIG. 2 is a view explaining the arrangement of a camera corresponding to a see-through state of a data photographing unit shown in FIG. 1.

Herein, the film 1 is shown in a state in which it is seen through the back side of a camera turned upside down as illustrated in FIG. 2.

A rectangular frame 1a indicated by broken lines in the film 1 represents one frame at a position that it takes when exposed for taking a shot. Within a back cover at a location corresponding to a lower left corner of one exposure frame 1a of the film 1, there is provided a data photographing unit 4 which includes liquid crystal indicator elements composed of, e.g., seven segments for each of 6 digits arrayed in the feeding direction of the film 1 and corresponding to a maximum data amount determined by the data of "year/month/day", and an illumination light source for illuminating the liquid crystal indicator elements. The liquid crystal indicator elements and the illumination light source of the data photographing unit 4 are driven by a data photographing driver 5. In parallel, the data photographed through the driver 5 is also indicated on a photographing data display 6 to be viewed from the outside of the camera. The data display 6 is disposed at a position viewable via a finder of the camera, or provided in the back cover of the camera as shown in FIG. 2.

The driver 5 includes an electronic clock and, is controllably driven by a control system 7 comprising a one-chip CPU adapted to implement the camera sequence control and other components. Connected to the control system 7 are an exposure control/exposure end signal generator 8, an exposure start signal generator 9 and a data photographing mode signal generator 10. The exposure start signal generator 9 issues a release signal obtained from a shutter release mechanism, for example. Upon receiving such an exposure start signal, the control system 7 instructs the exposure control/exposure end signal generator 8 to perform the exposure control. Then, upon receiving an exposure end signal from the exposure control/exposure end signal generator 8 at the completion of exposure, the control system 7 outputs a control signal to the driver 5, thereby instructing the data photographing unit 4 to photograph the data. The mode signal generator 10 has a data photographing mode select switch. Whenever a data photographing mode select signal is generated upon that switch being turned on, the control system 7 cyclically changes or switches a data photographing mode in order of, e.g., "year/month/day" photographing mode, "hour/minute" photographing mode, "year/month/day+hour/minute" photographing mode, and "non-data photographing" mode. In response to such switching of the mode, the data corresponding to the current setting mode is indicated on the data display 6. Note that in the "non-data photographing mode, the data display 6 does not indicate any data, or indicates a broken line of "- - -" or the like.

The control system 7 further includes a wind-up driver 11 for electrically driving a spool 3, and a rewind driver 12 for electrically driving the Patrone 2. The electric winding-up and rewinding of the film by the control system 7 are performed in manners of winding up the film on the basis of frame by frame, and then rewinding it upon detection of the film end in a state of normal photographing. In addition, when the "year/month/day+hour/minute" mode is selected, upon receiving the exposure end signal, the data of "year/month/day", e.g., "87 12 25" meaning Dec. 25, 1987, is photographed as first data by the data photographing unit 4 at the lower left corner of the exposure frame 1a of the frame 1 lying at a photo-taking position indicated by the broken lines. Subsequently, the wind-up drive 11 is driven to wind up the film 1 by a predetermined amount of distance within one frame, e.g., 1/n of one frame (where n is a number larger than 1), thereby moving the exposure frame 1a to a position of a shifted exposure frame 1b indicated by solid lines. In a temporarily stopped state after winding up the film by 1/n of one frame, the data of "hour/minute", e.g., "20 -- 43" meaning 20:43 hours is photographed as second data. Upon the completion of photographing the data of "hour/minute", the film is wound up by the remaining distance of the frame, i.e., 1−(1/n) of one frame, for preparation of taking a next shot.

A fed amount detecting unit 30 detects a wound-up or rewound amount of the film. As a matter of practical constitution, there can be employed any of the known mechanisms such as those comprising a combination of a sprocket in mesh with perforations of the film to be driven together and a detector for detecting the number of rotations of the sprocket, or means for photoelectrically detecting and counting the number of perforations having passed. Based on a detection output from the fed amount detecting unit 30, the control system 7 controls the feeding of the film necessary for preparing a next shot and for photographing the second data.

Figure 3:
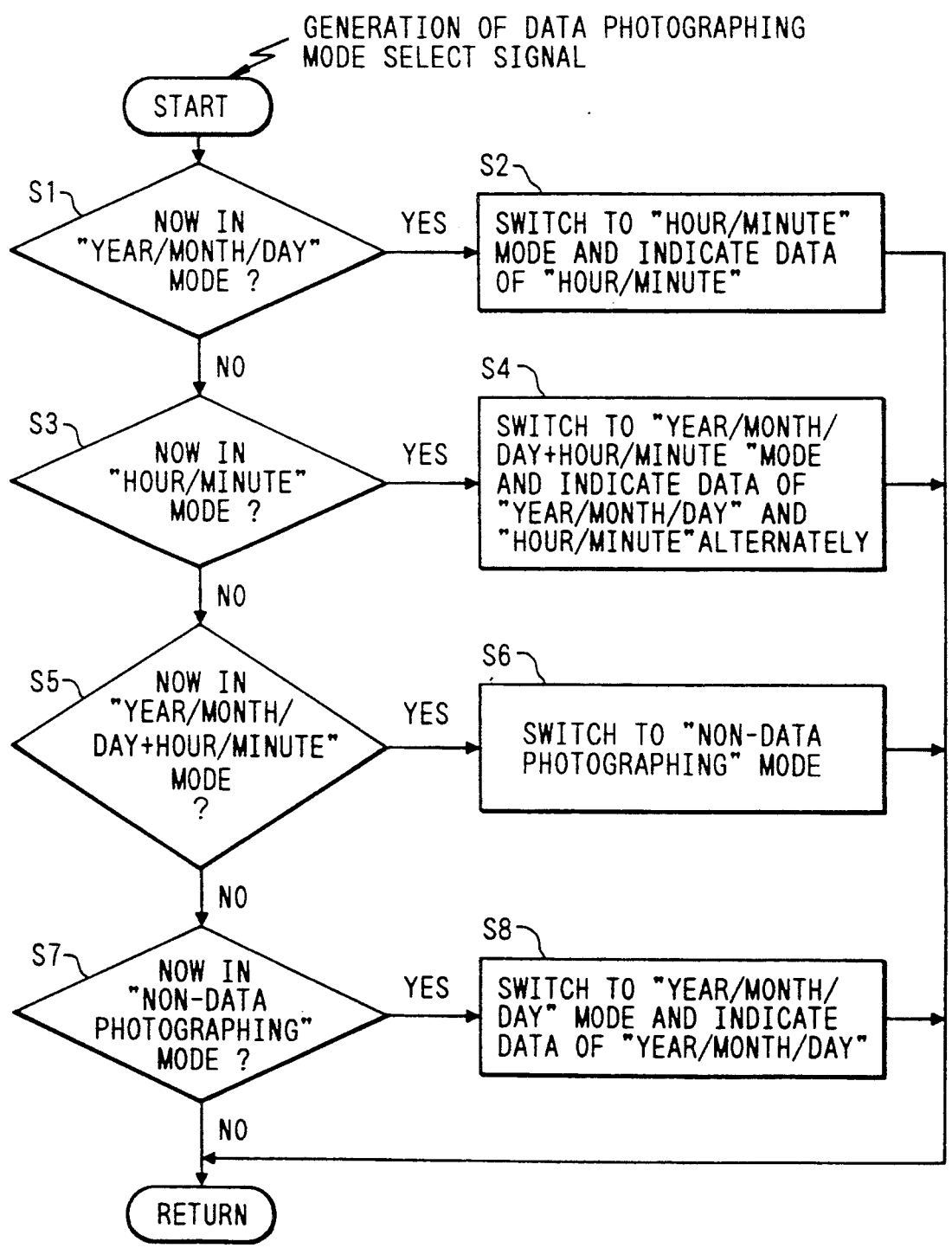
FIG. 3 is a flowchart showing the control for switching of data photographing modes and data display in the embodiment of FIG. 1.

FIG. 3 is a flowchart showing the sequence for switching modes of photographing data in the embodiment of FIG. 1.

The data photographing modes are switched from one to another upon receiving the data photographing mode select signal generated by actuating the mode select switch provided on the data photographing mode signal generator 10.

Generation of the data photographing mode select signal starts executing a control flow of FIG. 3. For example, if the "year/month/day" mode is now selected, it is first checked in step S1 whether or not the data photographing mode is now in the "year/month/day" mode. Since the "year/month/day" mode is now selected, the flow goes to step S2 for switching the mode to the "hour/minute" mode, thereby to indicate the data of "hour/minute" on the data display 6.

When the next data photographing mode select signal is generated, the mode has been switched to the "hour/minute" mode in the preceding step and, hence, the "hour/minute" mode is determined in step S3, followed by proceeding to step S4 for switching to the "year/month/day+hour/minute" mode. In this case, the data of "year/month/day" and the data of "hour/minute" are alternately indicated on the photographed data display 6 at intervals of a predetermined time, e.g., 1 second.

When the mode select signal is generated again in a state of the "year/month/day hour/minute" mode thus selected, the "year/month/day+hour/minute" mode is determined in step S5, followed by proceeding to step S6 for switching to the "non-data photographing" mode. In this case, the data display 6 does not indicate any data or indicates only a broken line of "-- -- --".

Further, when the mode select signal is generated in a state of the "non-data photographing" mode thus selected, the "non-data photographing" mode is determined in step S7, followed by proceeding to step S8 for switching to the "year/month/day" mode. In this case, the data of "year/month/day" is indicated on the data display 6.

Thus, whenever a photographer operates to change over the modes, the photographing modes are cyclically switched in order of the "year/month/day", "hour/minute", "year/month/day+hour/minute" and "non-data photographing" mode. Simultaneously, the data corresponding to the selected mode is indicated on the data display 6.

Figure 4:
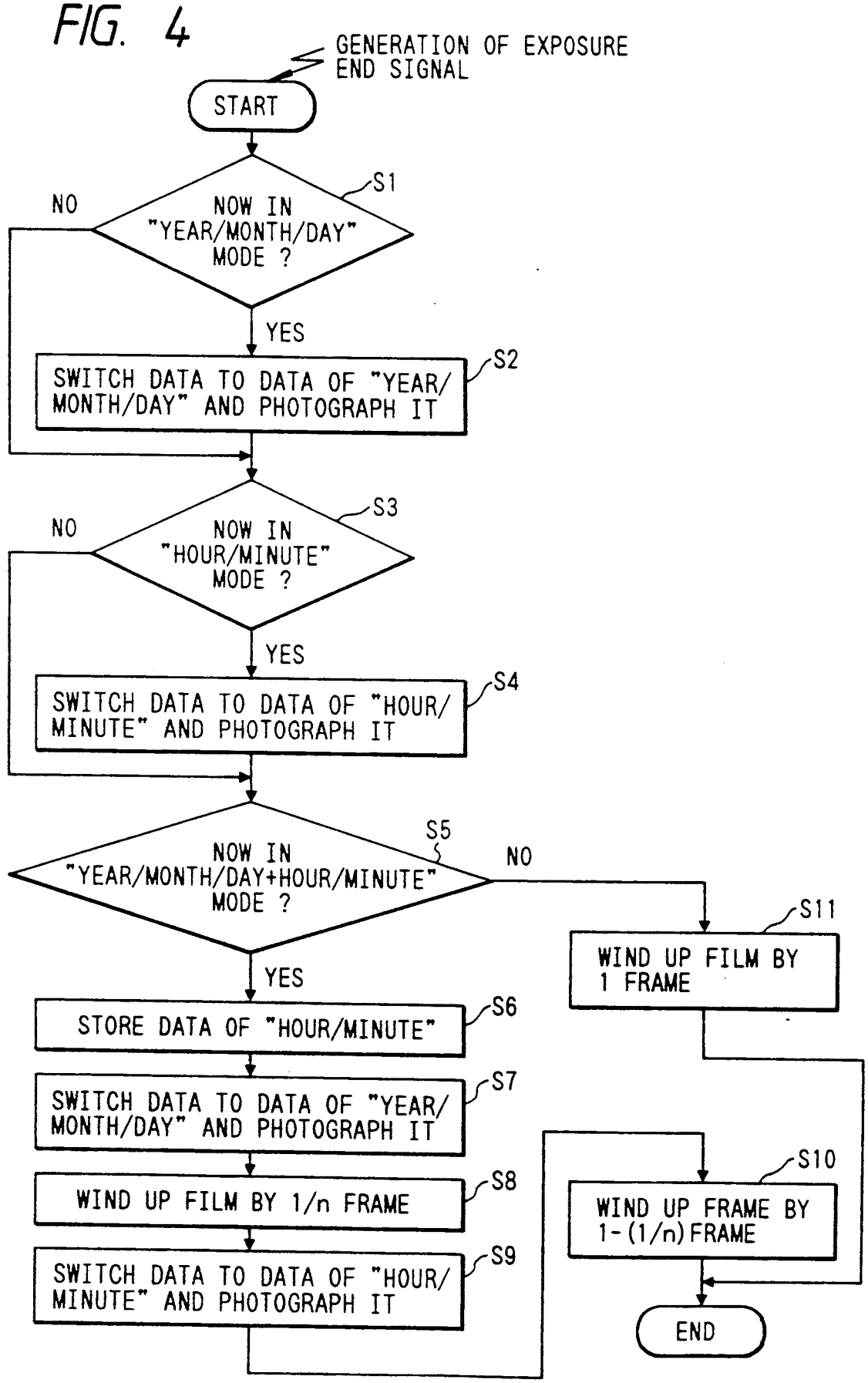
FIG. 4 is a flowchart showing the data photographing control in the embodiment of FIG. 1.

FIG. 4 is a flowchart showing the data photographing control by the control system 7 in the embodiment of FIG. 1. This data photographic control is executed as an interruption routine upon receiving the exposure end signal from the exposure control/exposure end signal generator 8.

More specifically, when the exposure end signal is issued after taking one shot, an interruption is allowed to execute the control flow of FIG. 4. It is first checked in step S1 whether or not the "year/month/day" mode is now selected. If the current photographing mode is in the "year/month/day" mode, the data is switched to "year/month/day" and photographed on the film in step S2. In other words, the data photographing drive 5 reads the current data of "year/month/day" as the data from the electronic clock built therein to indicate that data on the liquid crystal indicator elements of the imprinting unit 4, while energizing the illumination light source to emit light to photograph the data of "year/month/day" on the film. During a light emitting period (about 20 msec) of the illumination light source, that data is temporarily held to prevent a change in the data due to the elapse of time. This temporary data holding is similarly performed in any mode of photographing the data at any time. When photographing the data of "year/month/day" is completed, the flow goes to step S11 while skipping steps S3, S4, S5, where the film is wound up by one frame based on the detection output from the fed amount detecting unit 30, followed by bringing the process to the end.

Meanwhile, if the "hour/minute" photographing mode is now selected, the flow goes from step S3 to step S4 where the data is switched to the data of "hour/minute" and photographed. Then, in a like manner to the above case, the flow goes to step S11 for winding up the film by one frame, followed by bringing the process to the end.

Further, if the "year/month/day+hour/minute" photographing mode is selected, the flow goes from step S5 to Step S6 where the current data of "hour/minute" is read from the electronic clock and stored.

Subsequently, the data is switched to the data of "year/month/day" and photographed in step S7. Step S8 winds up the film by 1/n of one frame based on the detection output of the fed amount detecting unit 30. In next step S9, the data is switched to the data of "hour/minute" having been stored and held in step S6 for being photographed. The film is finally wound up by an amount of the remaining fractional frame in step S10 to terminate the process. Stated otherwise, the film is wound up by $1-(1/n)$ of one frame based on the detection output of the fed amount detecting unit 30 for bringing the process to the end.

By storing and holding the data of "hour/minute" at the time of generation of the exposure end signal in step S6 of FIG. 4, the data of "hour/minute" to be photographed is prevented from being delayed from the time point of end of the exposure by an amount corresponding to the sum of a time required for photographing the data of "year/month/day" in step S7 and a time required for winding up the film by 1/n of one frame in step S8.

Incidentally, where the time lag until photographing of the data of "hour/minute" gives rise to no problem, the process of step S6 can be dispensed with.

Instead of storing the data of "hour/minute", it is also possible to preset a predetermined time equal to an average time required for winding up the film by 1/n of one frame and subtract the predetermined time from the data of "hour/minute" read after winding up the film by 1/n of one frame, followed by photographing the resultant data of "hour/minute" after the subtraction.

Figure 5:
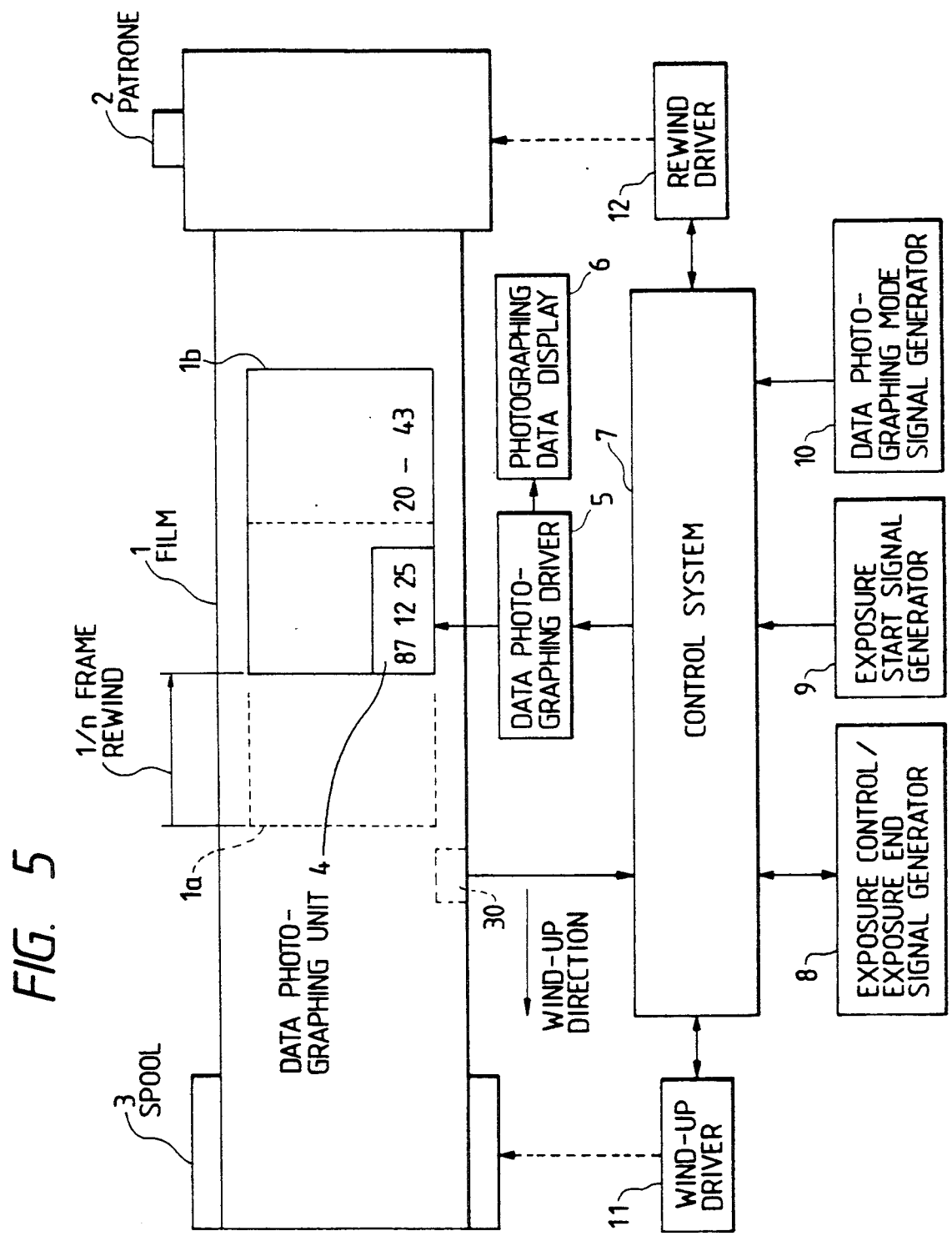
FIG. 5 is a block diagram showing another embodiment of the present invention.

FIG. 5 is a block diagram showing another embodiment of the present invention. This embodiment is featured in that the data of "hour/minute" is first photographed upon taking a shot and, after rewinding the film by 1/n of one frame, the data of "year/month/day" is then photographed. The embodiment of FIG. 5 is different from the embodiment of FIG. 1 in that the data photographing unit 4 is disposed at a lower right corner of the exposure frame 1a positioned to be ready for taking a shot as indicated by broken lines.

Figure 6:
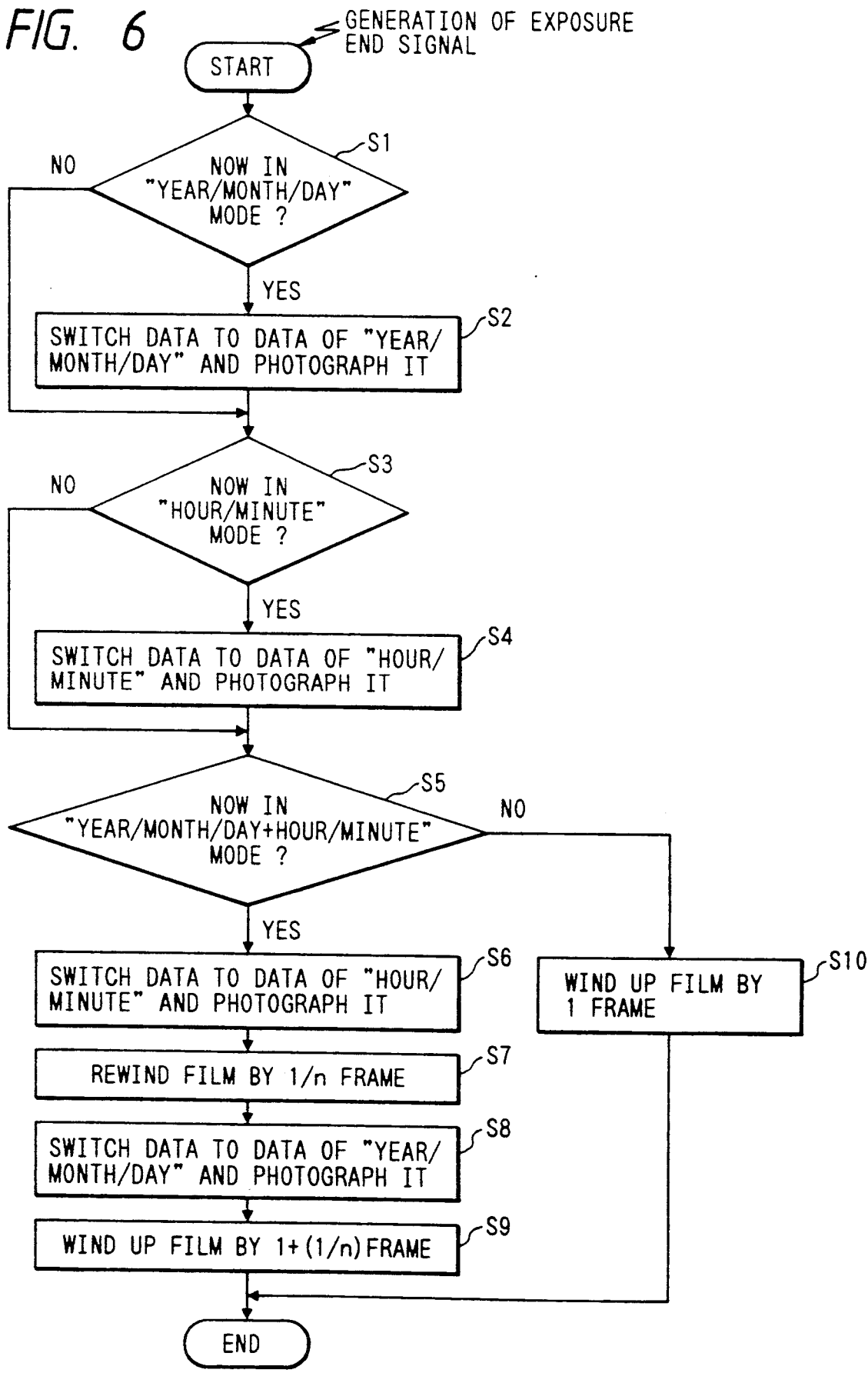
FIG. 6 is a flowchart showing the data photographing control in the embodiment of FIG. 5.

FIG. 6 is a flowchart showing the data photographing control by the control system 7 in the embodiment of FIG. 5.

In FIG. 6, the process of data photographing in the "year/month/day" or "hour/minute" photographing mode shown in steps S1-S4 is similar to that in the embodiment of FIG. 1.

If the "year/month/day hour/minute" photographing mode is determined in step S5, the flow goes to step S6 where the data is first switched to the data of "hour/minute" and photographed. Then, the film is rewound by 1/n of one frame in step S7 based on the detection output from the fed amount detecting unit 30, followed by proceeding to step S8 where the data is switched to the data of "year/month/day" and photographed. Subsequently, step S9 winds up the film by $1+(1/n)$ of one frame based on the detection output from the fed amount detecting unit 30, thereby preparing a next shot.

The feature of the embodiment of FIG. 5 illustrated in the flowchart of FIG. 6 is in that since the data of "hour/minute" is first photographed, there occurs no time lag between the time point of photographing (or reading) the data of "hour/minute" and the time point of end of the exposure as found in the embodiment of FIG. 1. This results in an advantage of photographing the data of "hour/minute" without the need of storing and holding it.

Further, in the embodiment of FIGS. 1 and 4, the second data is photographed after winding up the film by 1/n of one frame, and the second data may not be photographed on the last frame of the film because that frame has failed to wind up midway. On the contrary, in the embodiment of FIGS. 5 and 6, the second data is photographed after rewinding the film by 1/n of one frame, thereby allowing the second data to be surely photographed even on the last frame of the film.

Figure 7:
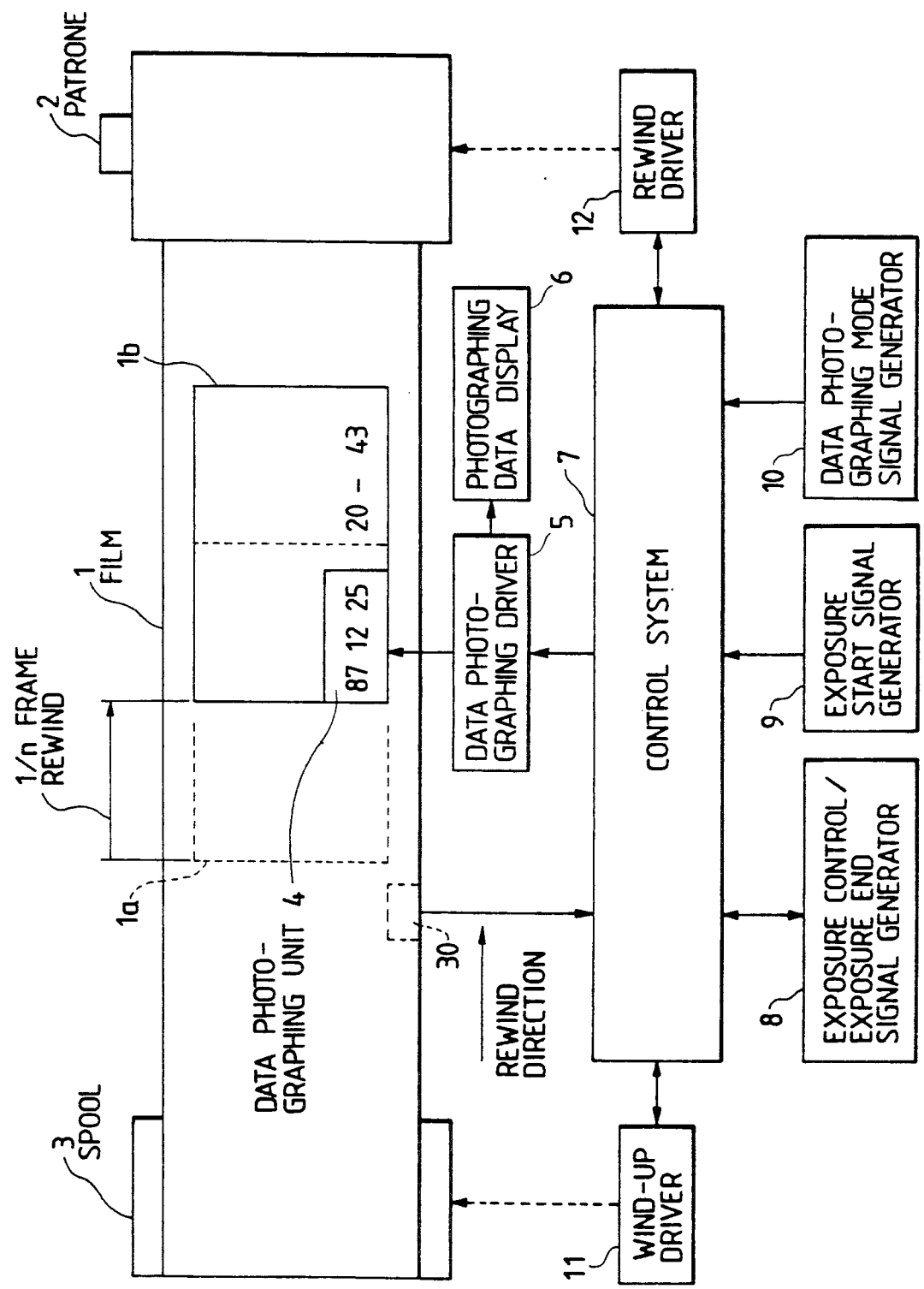
FIG. 7 is a block diagram showing another embodiment of the present invention.

FIG. 7 is a block diagram showing another embodiment of the present invention. This embodiment is featured in applying the present invention to the pre-winding technique that after loading the film 1, the film 1 is once entirely wind up around the spool 3 from the Patrone 2, and then rewound from the spool 3 to the Patrone 2 on the basis of frame by frame upon taking each shot. Arrangement of the data photographing unit 4 is similar to that in the embodiment of FIG. 5 such that it is located opposite to the lower right corner of the exposure frame 1a ready for taking a shot, as indicated by broken lines.

FIG. 8 is a flowchart showing the data photographing control by the control system 7 in the embodiment of FIG. 7. The data photographing control in this embodiment is similar to those in the embodiments of FIG. 1 and 5 for the process of photographing data in the "year/month/day" and "hour/minute" modes shown in steps S1-S4, but is different therefrom in the process of steps S5-S9.

More specifically if the "year/month/day+hour/minute" mode is determined in step S5, the flow goes to step S6 where the data is first switched to the data of "hour/minute" and photographed. Then, the film is rewound by 1/n of one frame in step S7 based on the detection output from the fed amount detecting unit 30. Subsequently, the data is switched to the data of "year/month/day" and photographed in step 8. Finally, step S9 rewinds the film by $1-(1/n)$ of one frame based on the detection output from the fed amount detecting unit 30, thereby preparing a next shot.

In the embodiment of FIG. 7 adopting the prewinding technique, too, there occurs no problem of a time lag from the time point of end of the exposure because the data of "hour/minute" is first photographed.

Also, in the embodiment of FIG. 7, since the second data (i.e., data of "year/month/day") is photographed after rewinding the film by 1/n of one frame, it is possible to photograph the second data on any frame.

Further, although the embodiment of FIGS. 5 and 6 is problematic in that the film is moved back and forth in the "year/month/day+hour/minute" mode and this makes longer a period of time required to be ready for taking a next shot, the embodiment of FIGS. 7 and 8 is free from such a problem.

It should be understood that although the above embodiments have been described as photographing the data of "year/month/day" and/or "hour/minute", the present invention is not limited to those particular embodiments. As an alternative, for example, the data of "year/month/day" and/or "hour/minute/second" may be photographed.

Moreover, it is needless to say that although the data has been explained as being switched from one to another after wind-up or rewind of the film in step S7 of FIG. 4, step S8 of FIG. 6 or step S8 of FIG. 8, the timing to switch the data is not limited to that particular one. For example, the data may be switched immediately after photographing the first data, or during the subsequent step of winding up or rewinding the film.

In addition, the present data photographing device may be modified in such a manner as not allowing to photograph the data of "hour/minute" alone, but permitting to photograph only both the data of "year/month/day" and "year/month/day+hour/minute".

Figure 9B:
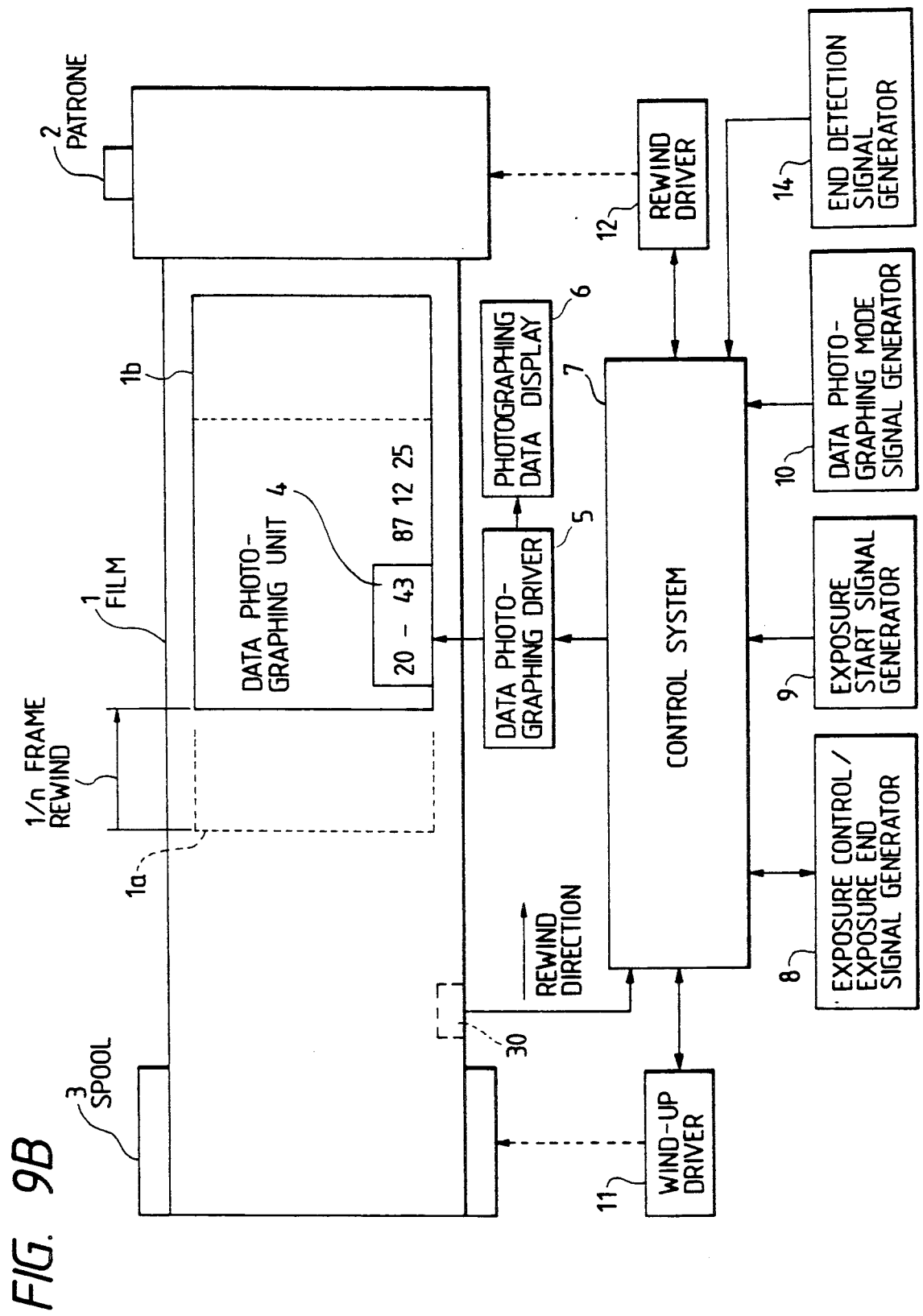

FIGS. 9A and 9B are block diagrams showing another embodiment of the present invention.

This embodiment is featured in that the data photographing unit 4 is disposed at the lower center of the exposure frame 1a of the film 1, and an end detection signal generator 14 is provided which detects that the film has failed to further wind up by reaching the end, for thereby generating an end detection signal. The remaining constitution of this embodiment is similar to that in the embodiment of FIG. 1.

In this embodiment, as shown in FIG. 9A, during the mode of photographing the data of "year/month/day+hour/minute" until the end detection signal is generated from the end detection signal generator 14, the data of "year/month/day" is first photographed upon taking a shot and, after winding the film by 1/n of one frame, the data of "hour/minute" is then photographed on the right side of the data of "year/month/day".

On the other hand, when the end detection signal is generated from the end detection signal generator 14, the data of "year/month/day" is first photographed upon taking a shot and, after rewinding the film by 1/n of one frame, the data of "hour/minute" is then photographed on the left side of the data of "year/month/day". Thereafter, the whole film is rewound electrically.

Thus, according to this embodiment, since the film is rewound only when photographing the second data on the last frame, and the whole film can be rewound successively after photographing the second data, the film is not required to move back and forth for photographing both the data as found in the embodiment of FIGS. 5 and 6. Accordingly, there occurs no problem of prolonging a period of time required to be ready for taking a shot.

Furthermore, in this embodiment, the data of "year/month/day" and "hour/minute" are inverted in order of their positions, thereby making it possible to easily determine which one is the last frame.

Figure 10A:
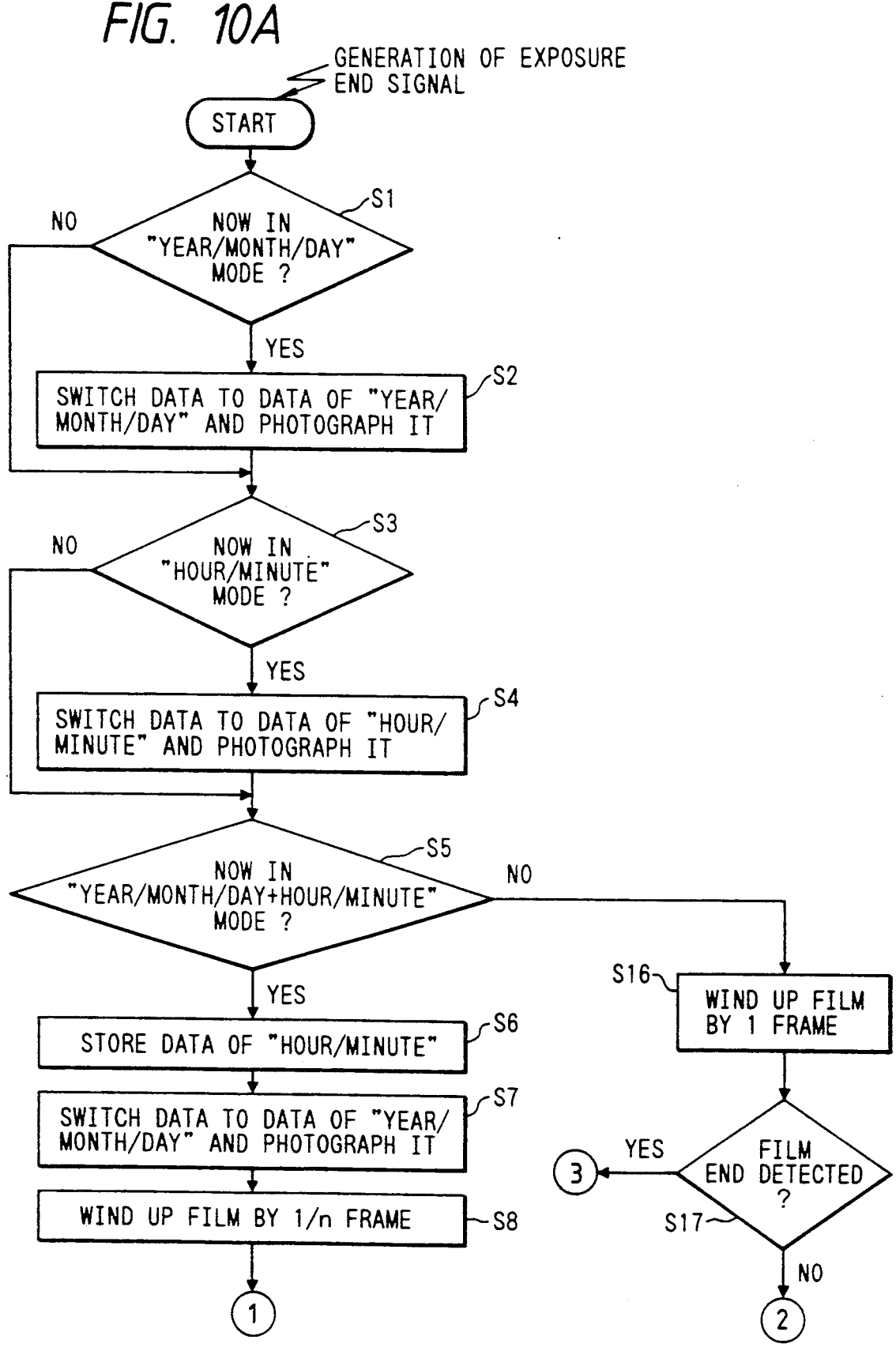
FIGS. 10A and 10B are flowcharts showing the data photographing control in the embodiment of FIGS. 9A and 9B.
Figure 10B:
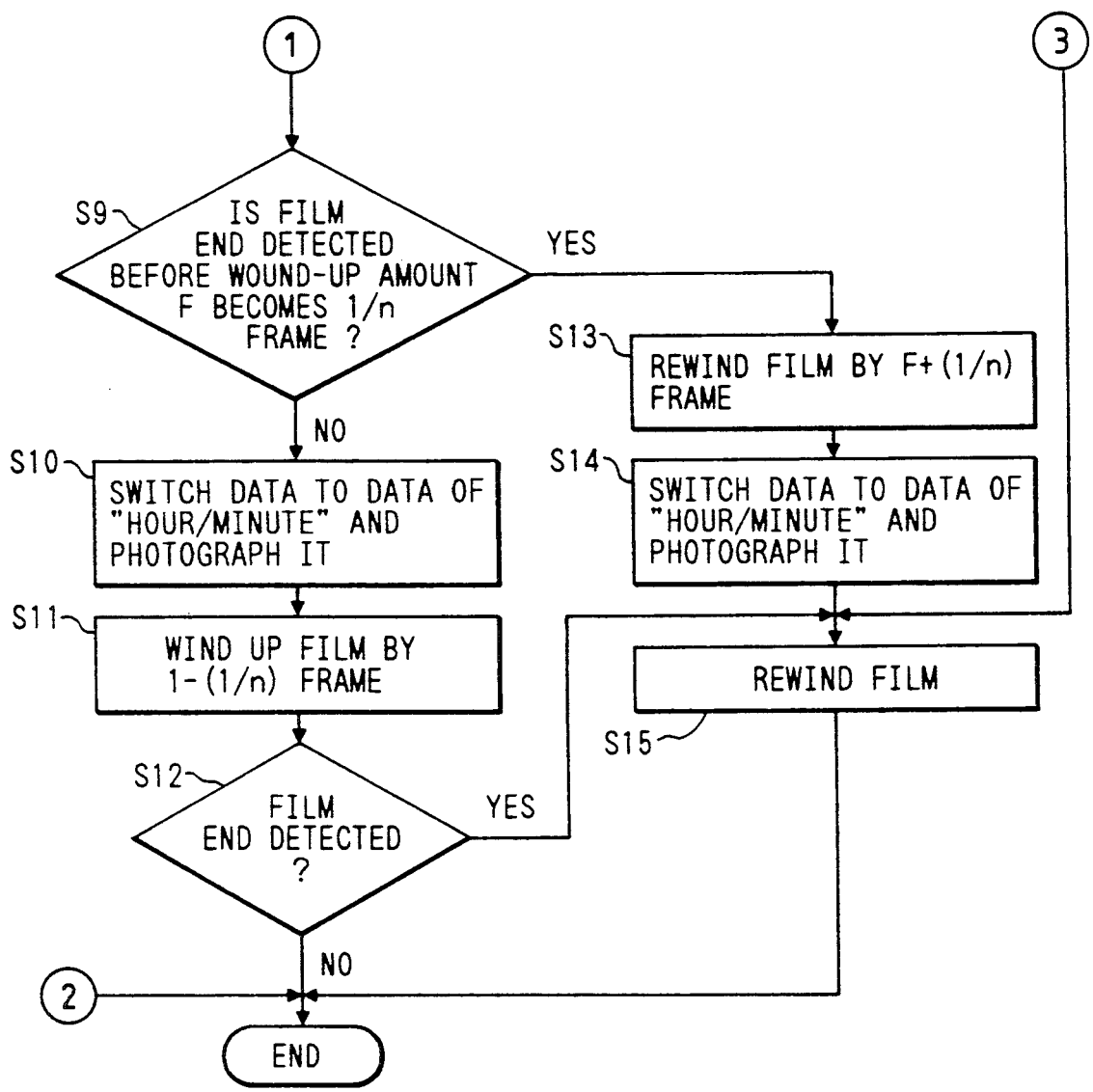

FIGS. 10A and 10B are flowcharts showing the data photographing control in the embodiment shown in FIGS. 9A and 9B.

In FIG. 10A, the process of photographing the data of "year/month/day" or "hour/minute" shown in steps S1–S4 is similar to that in the embodiment of FIG. 1.

If the "year/month/day+hour/minute" photographing mode is determined in step S5, the flow goes to step S6 for storing the data of "hour/minute". Then, the data is switched to the data of "year/month/day" and photographed in step S7 upon taking a shot. Subsequently, the film is wound up by 1/n of one frame in step S8, followed by proceeding to step S9 in FIG. 10B where it is checked whether or not the end detection signal has been generated before a woundup amount F of the film derived from the detection output of the fed amount detecting unit 30 becomes equal to 1/n of one frame.

During normal photographing, since no end detection signal is generated, the flow goes to step S10 where the data is switched to the data of "hour/minute" and photographed. In step S11, the film 1 is wound up by 1−(1/n) of one frame based on the detection output from the fed amount detecting unit 30, followed by proceeding to step S12 to check whether or not the film end is detected. If the film end is not detected in step S12, the process sequence is terminated. If the film end is detected in step S12, the flow goes to step S15 for rewinding the film entirely.

On the other hand, if the film end is detected before the wound-up amount F of the film has become equal to 1/n of one frame in step S9 of FIG. 10B, as a result of switching the data to the data of "year/month/day" and photographing it in step S7 and then winding up the film by 1/n of one frame based on the detection output from the fed amount detecting unit 30 in step S8, the flow goes to step S13 for rewinding the film in an amount corresponding to the sum of the wound-up amount F at that time and 1/n of one frame based on the detection output from the fed amount detecting unit 30. Then, the flow goes to step S14 where the data is switched to the data of "hour/minute" so that the data of "hour/minute" is photographed on the left side of the data of "year/month/day" as shown in FIG. 9B. Afterward, the film is rewound entirely in step S15.

Meanwhile, if the current mode is determined not to be the "year/month/day+hour/minute" mode in step S5 of FIG. 10A, the flow goes to step S16 where the film is wound up by one frame without photographing and data. If the film end is not detected in step S17, the process sequence is terminated by shown at ② in FIG. 10B. If the film end is detected in step S17, the flow goes to step S15 as shown at ③ FIG. 10B for rewinding the film entirely.

Figure 11A:
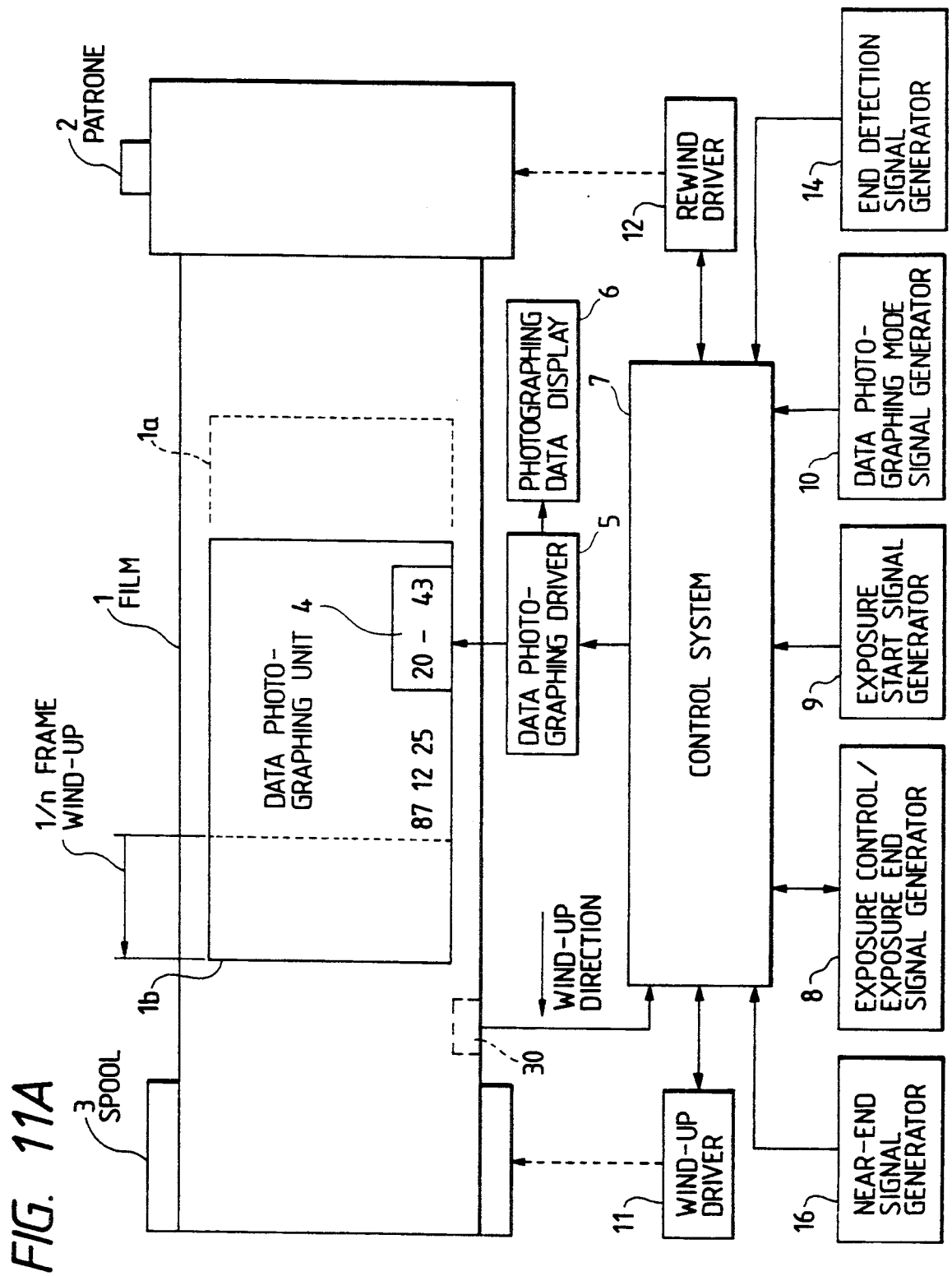
FIGS. 11A and 11B are block diagrams showing another embodiment of the present invention.
Figure 11B:
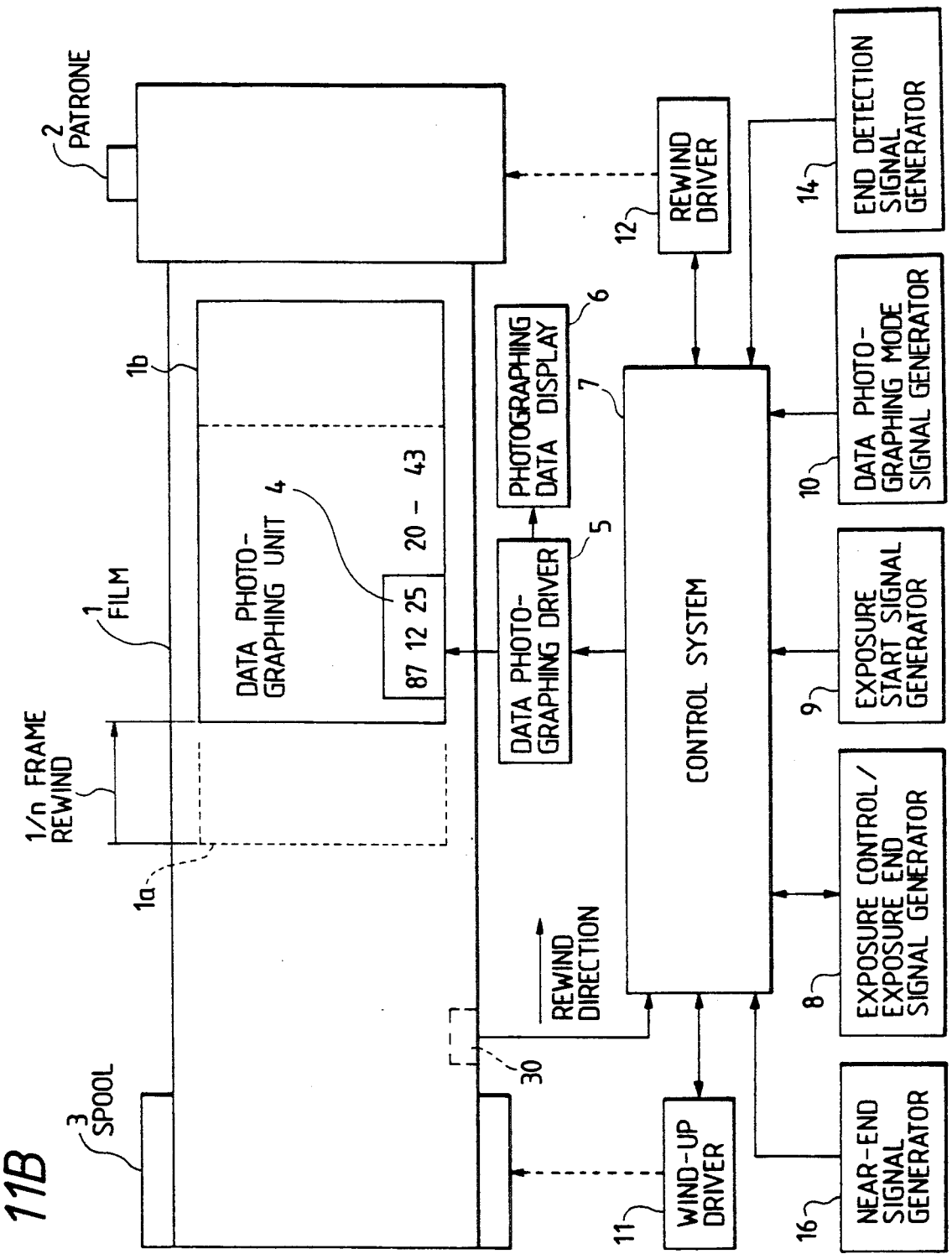

FIGS. 11A and 11B are block diagrams showing another embodiment of the present invention. This embodiment is featured in that the data photographing unit 4 is disposed at the lower center of the exposure frame 1a of the film 1, and the end detection signal generator 14 is provided which detects that the film has failed to further wind up by reaching the end, for thereby generating an end detection signal, as with the embodiment of FIG. 9, and that a near-end signal generator 16 is further provided which detects that the film comes near its end, for thereby generating a near-end signal.

The near-end signal generator 16 comprises a known device for reading information on the number of all frames, indicating how many pictures can be taken by the film loaded in the camera, from an information code provided on the Patrone or the film, a device for reading the information on the number of wound-up frames from a known film counter indicating the number of frames of the loaded film so far wound up, a device for comparing the information on the number of all frames and the information on the number of wound-up frames to calculate how many non-exposed frames still remain in the loaded film, and a device for generating the near-end signal when the number of non-exposed frames has become equal to a predetermined value, e.g., 2. In this embodiment, as shown in FIG. 11A, until generation of the near-end signal, the data of "year/month/day" is first photographed upon taking a shot and, after winding the film by 1/n of one frame, the data of "hour/minute" is then photographed on the right side of the data of "year/month/day".

On the other hand, when the near-end signal is generated from the near-end signal generator 16, as shown in FIG. 11B, the data of "hour/minute" is first photographed upon taking a shot and, after rewinding the film by 1/n of one frame, the data of "year/month/day" is then photographed on the left side of the data of "hour/minute".

Thus, since the data of "year/month/day" and "hour/minute" are not changed in order of their positions on the frames near the film end, there occurs no confusion when confirming the data on the photoprints.

Then, when the end detection signal is generated from the end detection signal generator 14 the film 1 is electrically rewound from the spool 3 to the Patrone 2.

In place of the information code reading device provided in the near-end signal generator 16, it is also possible to preset the information on the number of all frames to a certain fixed value, e.g., 10 in relation to one of commercially available films which has the minimum number of exposures, i.e., film of 12 frames, and to generate the near-end signal upon detecting that the number of exposed frames has reached 10.

Figure 12A:
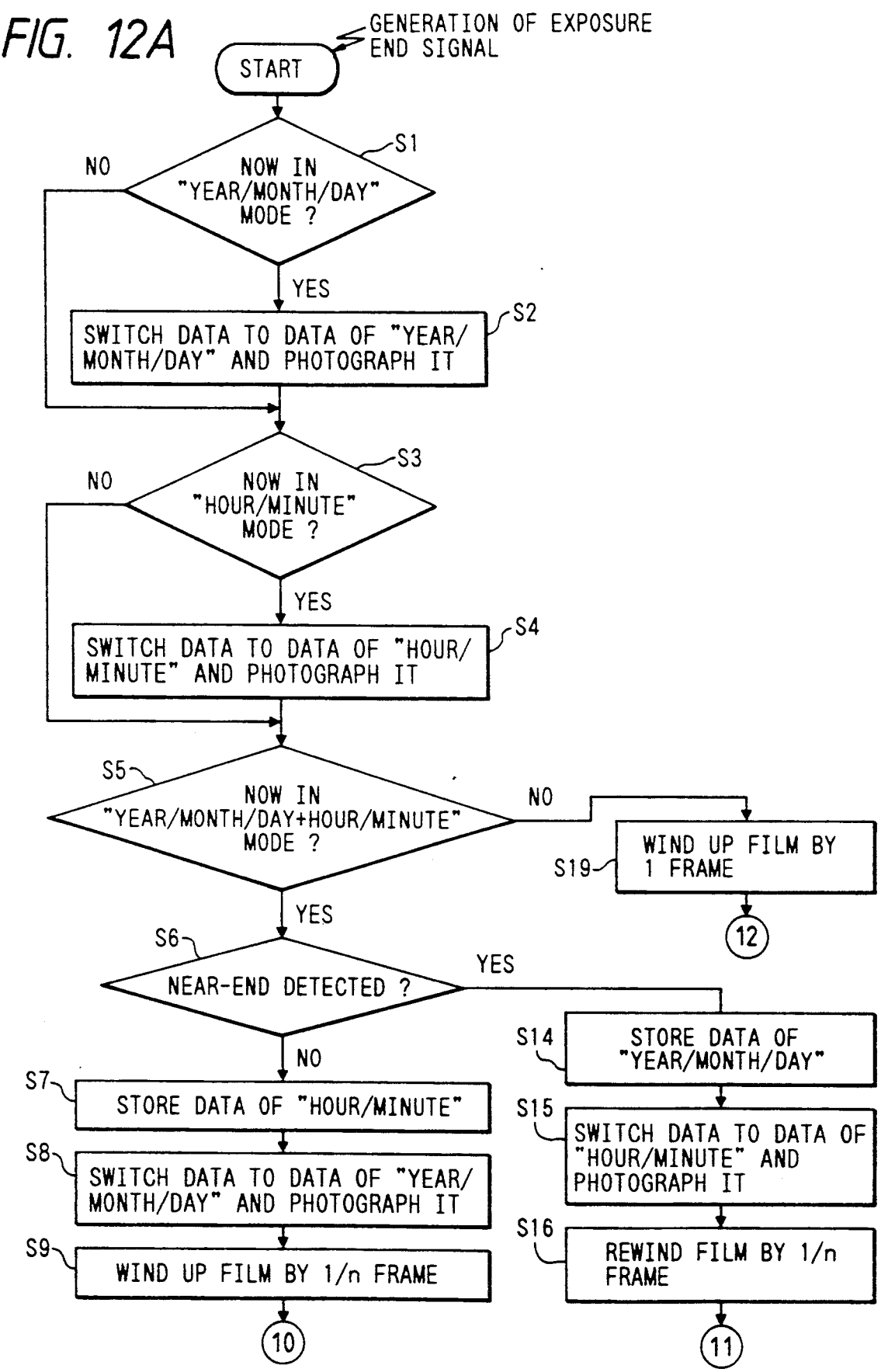
FIGS. 12A and 12B are flowcharts showing the data photographing control in the embodiment of FIGS. 11A and 11B.
Figure 12B:
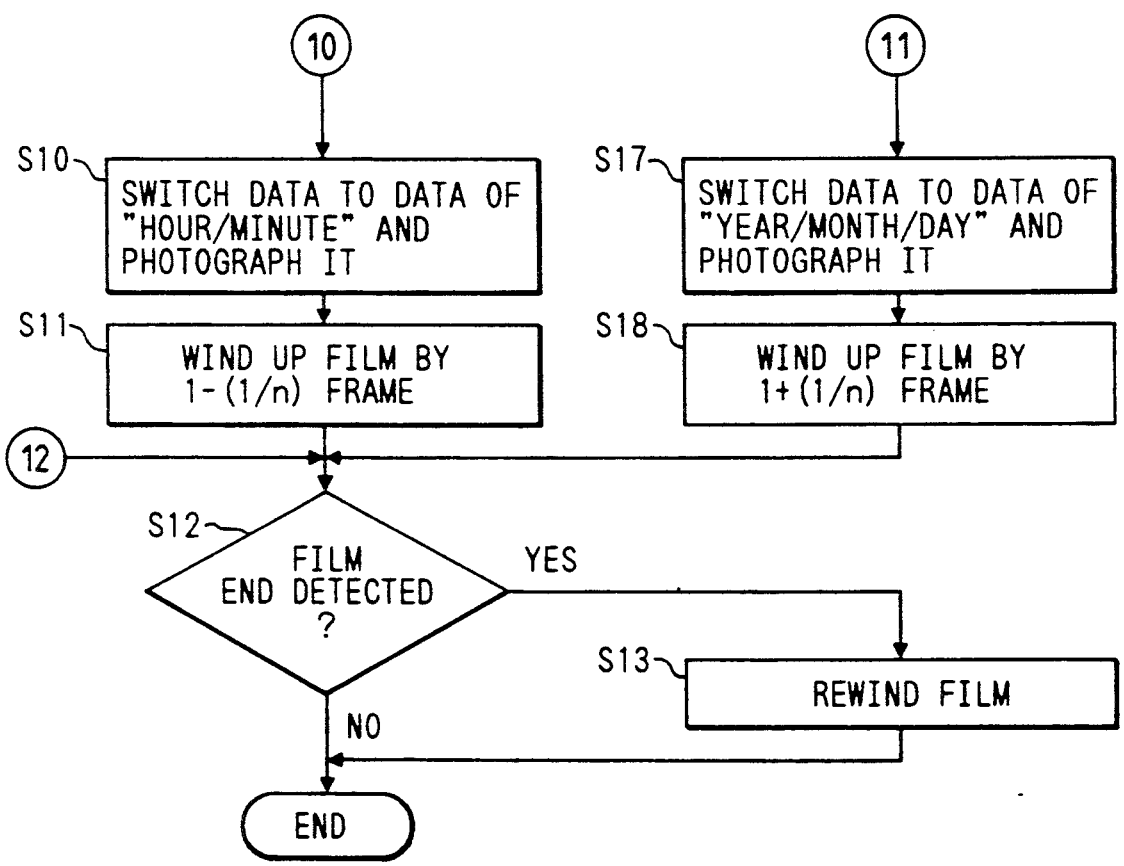

FIGS. 12A and 12B are flowcharts showing the data photographing control in the embodiment of FIGS. 11A and 11B.

In FIG. 12A, the process of photographing the data of "year/month/day" or "hour/minute" shown in steps S1–S4 is similar to that in the embodiment of FIG. 1.

If the current photographing mode is determined to be the "year/month/day+hour/minute" mode in step S5, the flow goes to step S6 for checking whether or not the near-end of the film is detected. If the near-end of the film is not detected, step S7 stores the data of "hour/minute". Then, the data is switched to the data of "year/month/day" and photographed in step S8 upon taking a shot. Subsequently, the film is wound up by 1/n of one frame in step S9 based on the detection output from the fed amount detecting unit 30. After winding up the film by 1/n of one frame, the flow goes to step S10 in FIG. 12B where the data is switched to the data of "hour/minute" and photographed. In step S11, the film 1 is wound up by 1−(1/n) of one frame based on the detection output from the fed amount detecting unit 30, thereby preparing for a next shot. After checking detection of the film end in step S12, the process sequence is terminated. If the film end is detected in step S12, the flow goes to step S13 for rewinding the whole film electrically.

On the other hand, if the near-end of the film is detected in step S6 of FIG. 12A, the flow goes to step S14 for storing the data of "year/month/day". Then, the data is switched to the data of "hour/minute" and photographed in step S15 upon taking a shot. Subsequently, the film is rewound by 1/n of one frame in step S16 based on the detection output from the fed amount detecting unit 30. After rewinding the film by 1/n of one frame, the flow goes to step S17 in FIG. 12B where the data is switched to the data of "year/month/day" and photographed. In step S18, the film 1 is wound up by 1+(1/n) of one frame based on the detection output from the fed amount detecting unit 30, thereby preparing for a next shot. When the film end is detected during wind-up of the film in step S18, the flow goes to step S13 for rewinding the whole film electrically.

As is apparent, if the current imprint mode is other then the "year/month/day hour/minute" mode in step S5 of FIG. 12A, i.e., if any data photographing mode is not set, the flow goes to step S19 where the film is wound up by one frame without photographing any data. Then, step S12 in FIG. 12B checks whether or not the film end is detected. If the film end is not detected, the process sequence is terminated. If the film end is detected, the flow goes to step S13 for rewinding the whole film electrically.

Figure 13A:
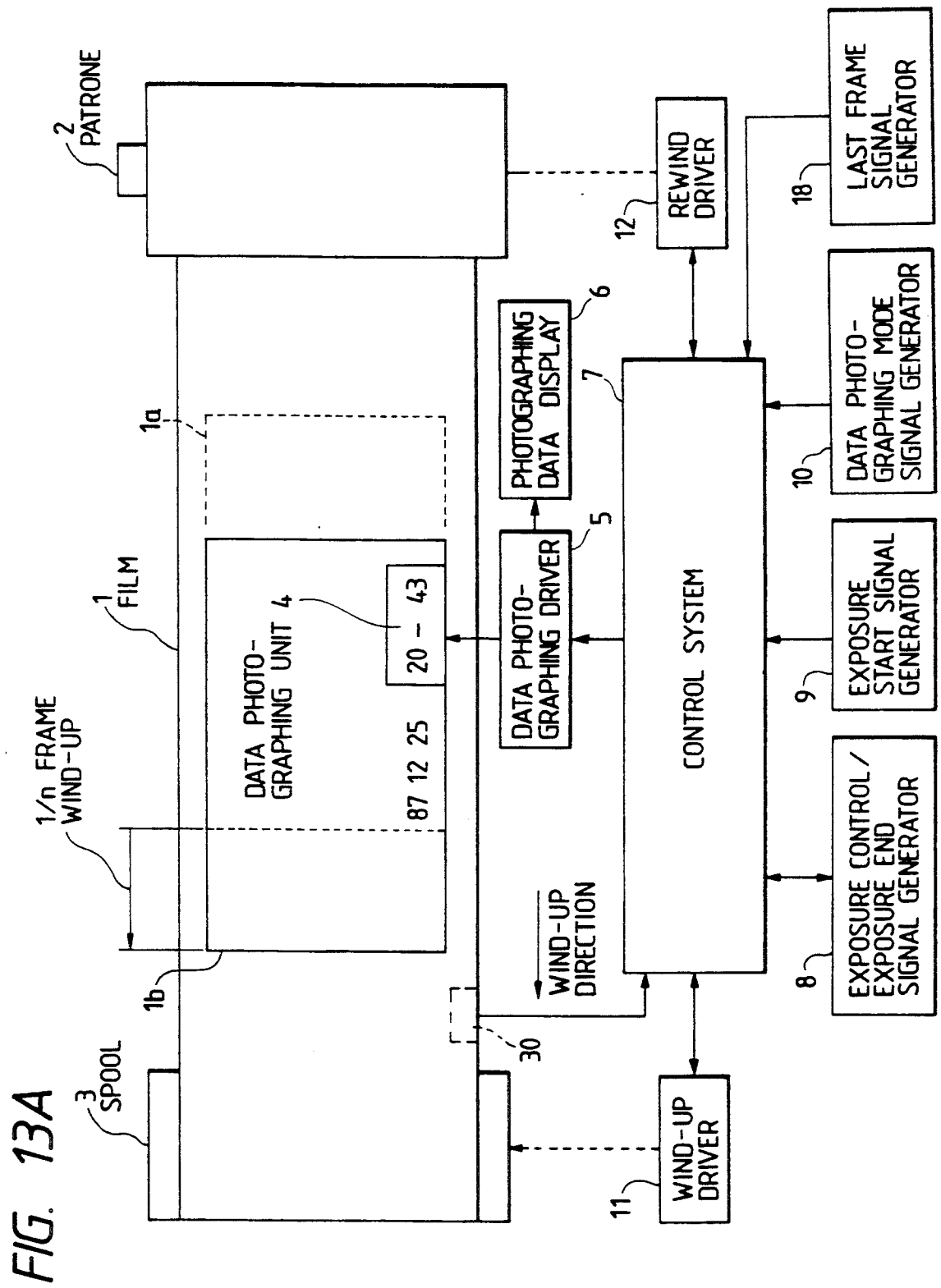

FIGS. 13A and 13B are block diagrams showing another embodiment of the present invention. This embodiment is featured in providing a last frame signal generator 18 in place of the end detection signal generator 14 and the near-end signal generator 16 which are provided in the embodiment of FIGS. 11A and 11B.

The last frame signal generator 18 has a function of generating a last frame signal upon detecting that the film 1 has reached the last frame. The last frame signal generator 18 comprises a known device for reading the information on the number of all frames, indicating how many pictures can be taken by the film loaded in the camera, from an information code provided on the Patrone or the film, a device for reading the information on the number of wound-up frames from a known film counter indicating the number of frames of the loaded film so far wound up, a device for comparing the information on the number of all frames and the information on the number of wound-up frames to calculate how many non-exposed frames still remain in the loaded film, and a device for generating the last frame signal when the number of non-exposed frames has become zero.

In this embodiment, as shown in FIG. 13A, during normal photographing until generation of the last frame signal, the data of "year/month/day" is first photographed upon taking a shot and, after winding the film by 1/n of one frame subsequent to photographing of the data of "year/month/day", the data of "hour/minute" is then photographed on the right side of the data of "year/month/day".

On the other hand, when the last frame signal is generated from the last frame signal generator 18, as shown in FIG. 13B, the data of "hour/minute" is first photographed upon taking a shot and, after rewinding the film by 1/n of one frame subsequent to photographing of the data of "hour/minute", the data of "year/month/day" is then photographed on the left side of the data of "hour/minute". After photographing the data of "year/month/day", the whole film 1 is rewound electrically.

Figure 14B:
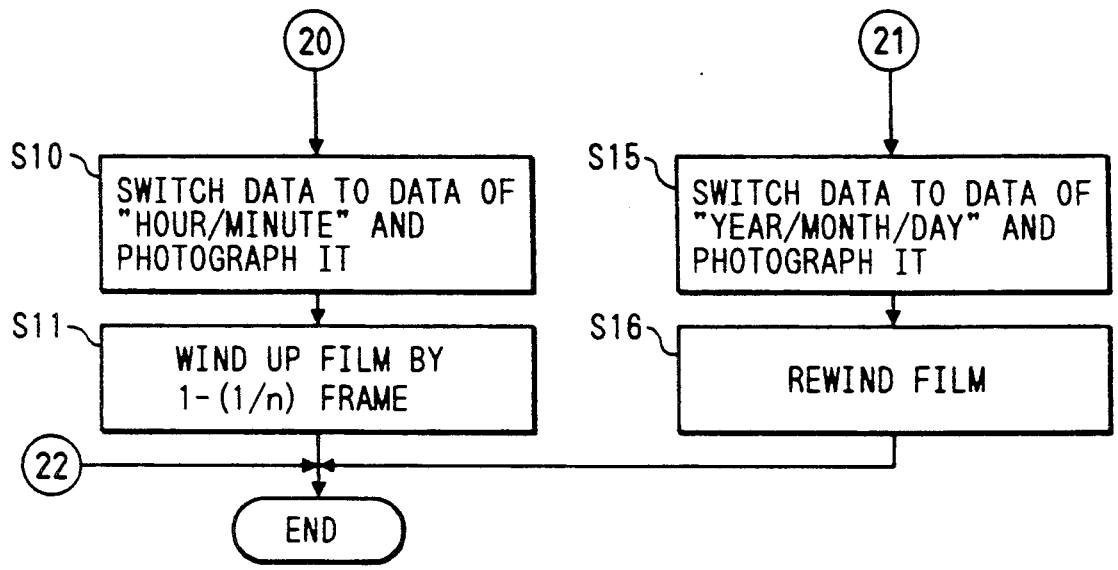

FIGS. 14A and 14B are flowcharts showing the data photographing control in the embodiment of FIGS. 13A and 13B.

In FIG. 14A, the process of photographing the data of "year/month/day" or "hour/minute" shown in steps S1–S4 is similar to that in the embodiment of FIG. 1.

If the current photographing mode is determined to be the "year/month/day+hour/minute" mode in step S5, it is checked in step S6 whether or not the last frame is detected. If the last frame is not detected, the flow goes to step S7 for storing the data of "hour/minute". Then, the data is switched to the data of "year/month/day" and photographed in step S8 upon taking a shot, followed by proceeding to step S9 to wind up the film by 1/n of one frame. Subsequently, the flow goes to step S10 in FIG. 14B where the cut-in data is switched to the data of "hour/minute" and photographed. In step S11, the film is wound up by 1−(1/n) of one frame, thereby preparing for a next shot.

On the other hand, if the last frame is detected in step S6 of FIG. 14A, the flow goes to step S12 for storing the data of "year/month/day". Then, the data is switched to the data of "hour/minute" and photographed in step S13 upon taking a shot, followed by proceeding to step S14 to rewind the film by 1/n of one frame. Subsequently, the flow goes to step S15 in FIG. 14B where the data is switched to the data of "year/month/day" and photographed. In step S16, the whole film is rewound electrically.

Figure 15:
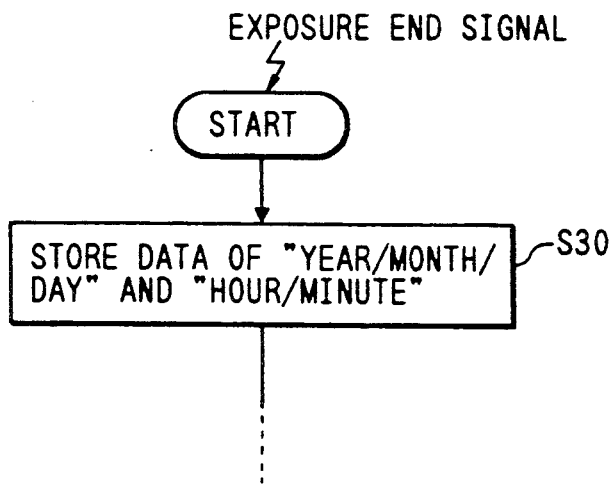
FIG. 15 is a flowchart showing a modification in the flowcharts of FIGS. 4, 6, 8, 10A–10B, 12A–12B and 14A–14B.

FIG. 15 is a flowchart showing a modification in the flowcharts of FIGS. 4, 6, 8, 10A-10B, 12A-12B and 14A-14B. The control flow of FIG. 15 has a feature of storing both the data of "year/month/day" and "hour/minute" in step S30 as a first process of the routine started upon receiving the exposure end signal. More specifically, this step S30 is inserted before step S1 in each of FIGS. 4, 6, 8, 10A, 12A and 14A, and 14, and those stored data are read and photographed on demand when photographing them. Therefore, incorporating such a modification as shown in FIG. 15 makes it possible to dispense with step S6 of storing the data of "hour/minute" in FIGS. 4 and 10A, step S7 of storing the data of "hour/minute" and step S14 of storing the data of "year/month/day" in FIG. 12A, as well as step S7 of storing the data of "hour/minute" and step S12 of storing the data of "year/month/day" in FIG. 14A. By storing both the data immediately after the completion of exposure, it is ensured that the time point of reading the first data from the electronic clock is kept substantially coincident with the time point of reading the second data from the electronic clock, even in the case of successively photographing on the same frame of the film both the data varying with the elapse of time. This permits solving the problem in the prior art in which the photographed data may be largely different from the actual time point of taking the shot, if those time points of reading the first and second data are just set apart from each other across the turn of a year, month, day or hour.

It is to be noted that although any of the flowcharts of FIGS. 4, 6, 8, 10A-10B, 12A-12B, 14A-14B and 15 is started upon generation of the exposure end signal, the present invention is not limited to that particular embodiment. For example, the flowcharts may be started immediately before trigger of the exposure or during the exposure.

Also, although the foregoing embodiments have been explained as successively photographing two kinds of numeral data varying with the elapse of time, such as the data of "year/month/day" and "hour/minute", the present invention is not limited to use of those data. Alternatively, it is possible to successively photograph a string of characters such as alphabet (e.g., "HAPPY BIRTHDAY" and "CONGRATULATION"), symbols (e.g., "!" and " "), as well as adequate combinations of numeral and character strings and symbols. For example, combinations of "HAPPY BIRTHDAY" and "I LOVE YOU", "HAPPY BIRTHDAY" and "!", or "HAPPY BIRTHDAY" and "87 12 25" may be photographed in order.

Furthermore, the number of data to be photographed in order is not limited to two, and three or more kinds of data may be photographed. In this case, it is only required that the number of temporarily suspending feeding of the film to photograph the second and subsequent data is increased to the number of kinds of data to be photographed at the second and subsequent times. In the case of successively photographing four kinds of data such as "HAPPY BIRTHDAY", "!", "87 12 25" and "20 -- 43", for example, the film feeding may be temporarily interrupted three times.

We claim:

1. A camera comprising:
exposure signal generating means for generating an exposure signal upon an exposure operation of said camera;
data recording means disposed opposite to a location of an exposure frame of a film to be exposed or having been exposed with said exposure operation;
data generating means for generating plural kinds of data signals corresponding to at least two kinds of data to be recorded;
feeding means actuated upon generation of said exposure signal to feed said film for moving a subsequent frame to be exposed to said location;
said data recording means causing first data corresponding to one of said plural kinds of data signals to be recorded on said exposure frame at a first position thereof before said feeding means starts said film feeding;
determining means for determining whether second data corresponding to another of said plural kinds of data signals is to be recorded; and
feeding suspension means operable for temporarily suspending said film feeding by said feeding means;
said feeding suspension means temporarily suspending said film feeding by said feeding means when said film has been fed to bring said data recording means into opposite relation to a second position on said exposure frame different from said first position, but only when said determining means determines that said second data is to be recorded;
said data recording means causing said second data to be recorded at said second position upon said temporary suspension of said film feeding, whereby said first data recorded at said first position and said second data recorded at said second position are disposed in said exposure frame side by side in the feeding direction of said film.

2. A camera comprising:
exposure signal generating means for generating an exposure signal upon an exposure operation of said camera;
data recording means disposed opposite to a location of an exposure frame of a film to be exposed or having been exposed with said exposure operation;
data generating means for generating plural kinds of data signals corresponding to at least two kinds of data to be recorded;
feeding means actuated upon generation of said exposure signal to feed said film for moving a subsequent frame to be exposed to said location;
mode setting means for selectively setting any of a single data recording mode in which any one of said plural kinds of data is recorded on said exposure frame, a plural data recording mode in which at least two of said plural kinds of data are recorded on said exposure frame, and a non-data recording mode in which no data is recorded;
said data recording means being operated before start of said film feeding by said feeding means, when either said single data recording mode or said plural data recording mode is set, to cause first data corresponding to one of said plural kinds of data signals to be recorded on said exposure frame at a first position thereof, said data recording means being inoperative when said non-data recording mode is set;
determining means for determining whether second data corresponding to another of said plural kinds of data signals is to be recorded on said exposure frame; and feeding suspension means operable for temporarily suspending said film feeding by said feeding means;

said feeding suspension means temporarily suspending said film feeding by said film means when said film has been fed to bring said data recording means into opposite relation to a second position on said exposure frame different from said first position, but only when said plural data recording mode is set and only when said determining means determines that second data is to be recorded;

said data recording means causing said second data to be recorded at said second position upon said temporary suspension of said film feeding, whereby said first data recorded at said first position and said second data recorded at said second position are disposed in said exposure frame side by side in the film feeding direction of said film.

3. A camera comprising:

exposure signal generating means for generating an exposure signal upon an exposure operation of said camera;

data recording means disposed opposite to a location of an exposure frame of a film to be exposed or having been exposed with said exposure operation;

data generating means for generating plural kinds of data signals corresponding to at least two kinds of data to be recorded;

data storage means for storing said plural kinds of data signals upon generation of said exposure signal, thereby to prevent the stored data signals from being varied with the elapse of time;

feeding means actuated upon generation of said exposure signal to feed said film for moving a subsequent frame to be exposed to said location;

said data recording means causing first data, corresponding to one of said plural kinds of data signals stored in said data storage means, to be recorded on said exposure frame at a first position thereof before said feeding means starts said film feeding;

determining means for determining whether second data corresponding to another of said plural kinds of data signals stored in said storage means is to be recorded; and feeding suspension means operable for temporarily suspending said film feeding by said feeding means;

said feeding suspension means temporarily suspending said film feeding by said feeding means when said film has been fed to bring said data recording means into opposite relation to a second position on said exposure frame different from said first position, but only when said determining means determines that second data is to be recorded;

said data recording means causing said second data to be recorded at said second position upon said temporary suspension of said film feeding, whereby said first data recorded at said first position and said second data recorded at said second position are disposed in said exposure frame side by side in the feeding direction of said film.

4. A camera comprising:

exposure signal generating means for generating an exposure signal upon an exposure operation of said camera;

data recording means disposed opposite to a location of an exposure frame of a film to be exposed or having been exposed by said exposure operation;

data generating means for generating plural kinds of data signals corresponding to at least two kinds of data to be recorded. said two kinds of data being comprised of first data including information as to "year/month/day" and second data including information as to "hour/minute", both of which data vary with the elapse of time;

data storage means for storing a data signal corresponding to said first data and a data signal corresponding to said second data upon generation of said exposure signal, thereby to prevent both of the stored data signals from varying with the elapse of time;

feeding means actuated upon generation of said exposure signal to feed said film for moving a subsequent frame to be exposed to said location;

data recording mode setting means for selectively setting any one of a single data recording mode in which either said first data or said second data is recorded on said exposure frame, a two data recording mode in which said first and second data are recorded on said exposure frame, and a non-data recording mode in which no data is recorded;

said data recording means being operated before start of said film feeding by said feeding means, when either said single data recording mode or said two data recording mode is set, to cause either one of said first data and said second data to be recorded on said exposure frame at a first position thereof, based on a respective stored data signal, but said data recording means being inoperative when said non-data recording mode is set;

determining means for determining whether one of said first data and said second data is to be recorded after the recording of the other of said first and second data in said exposure frame; and feeding suspension means for temporarily suspending said film feeding by said feeding means;

said feeding suspension means temporarily suspending said film feeding by said feeding means when said film has been fed to bring said data recording means into opposite relation to a second position on said exposure frame different from said first position, but only when said two data recording mode is set and only when said determining means determines that said one data is to be recorded after the other data;

said data recording means causing said one data to be recorded at said second position upon temporary suspension of said film feeding, based on a respective stored signal, whereby said one data recorded at said second position and said other data recorded at said first position are disposed in said exposure frame side by side in the feeding direction of said film.

5. A camera comprising:

exposure signal generating means for generating an exposure signal upon an exposure operation of said camera;

data recording means disposed opposite to a location of an exposure frame of a film to be exposed or having been exposed with said exposure operation;

data generating means for generating plural kinds of data signals corresponding to at least two kinds of data to be recorded;

said data recording means causing first data corresponding to one of said plural kinds of data signals to be recorded on said exposure frame at a first position thereof upon generation of said exposure signal;

rewind means for rewinding said film to bring said data recording means into opposite relation to a second position on said exposure frame different from said first position;

said data recording means causing second data corresponding to another of said plural kinds of data signals to be recorded at said second position after said rewinding of said film, whereby said first data recorded at said first position and said second data recorded at said second position are disposed in said exposure frame of said film side by side in the feeding direction of said film; and wind-up means actuated upon completion of said recording of said second data for winding-up said film to bring a subsequent frame to be exposed to said location.

6. A camera comprising:

exposure signal generating means for generating an exposure signal upon an exposure operation of said camera;

data recording means disposed opposite to a location of an exposure frame of a film to be exposed or having been exposed with said exposure operation;

data generating means for generating plural kinds of data signals corresponding to at least two kinds of data to be recorded;

wind-up means for winding-up said film to bring a subsequent frame to be exposed to said location;

end detecting means for detecting that said film has reached an end of the film and has failed to be further wound by said wind-up means, thereby generating an end detection signal;

said data recording means causing first data corresponding to one of said plural kinds of data signals to be recorded on said exposure frame at a first position thereof upon generation of said exposure signal;

said wind-up means being actuated in response to the completion of said recording of said first data;

wind-up suspension means for temporarily suspending film wind-up by said wind-up means when said film has been wound-up to bring said data recording means into opposite relation to a second position on said exposure frame different from said first position;

said data recording means causing second data corresponding to another of said plural kinds of data signals to be recorded at said second position on said exposure frame upon the temporary suspension of said film winding-up, whereby said first data recorded at said first position and said second data recorded at said second position are disposed in said exposure frame side by side in the feeding direction of said film; and rewind means actuated when said end detection signal is generated before said film has been wound-up to bring said data recording means into opposite relation to said second position, thereby to rewind said film until said data recording means comes into opposite relation to a third position on said exposure frame, said third position and said second position being opposite to each other with said first position therebetween;

said data recording means causing second data corresponding to another of said plural kinds of data signals to be recorded at said third position after said rewinding of said film, whereby said first data recorded at said first position and said second data recorded at said third position are disposed in said exposure frame side by side in the feeding direction of said film.

7. A camera comprising:

exposure signal generating means for generating an exposure signal upon an exposure operation of said camera;

data recording means disposed opposite to a location of an exposure frame of a film to be exposed or having been exposed with said exposure operation;

data generating means for generating plural kinds of data signals corresponding to at least two kinds of data to be recorded;

wind-up means for winding-up said film to bring a subsequent frame to be exposed to said location;

number of wound-up frames detecting means for generating a first frame number signal until the number of frames of said film wound-up by said wind-up means reaches a predetermined value and a second frame number signal after the reaching of the predetermined value;

said data recording means causing first data corresponding to one of said plural kinds of data signals to be recorded on said exposure frame at a first position thereof upon generation of said exposure signal while said first frame number signal is being generated, and causing second data corresponding to another of said plural kinds of data signals to be recorded on said exposure frame at a first position thereof upon generation of said exposure signal while said second frame number is being generated;

said wind-up means being actuated upon the completion of said recording of said first data at said first position while said first frame signal is being generated;

wind-up suspension means for temporarily suspending said film winding-up by said wind-up means when said film has been wound-up to bring said data recording means into opposite relation to a second position on said exposure film different from said first position;

said data recording means causing said second data to be recorded at said second position upon said temporary suspension of said film wind-up, whereby said first data recorded at said second position are disposed in said exposure frame side by side in the feeding direction of said film; and rewind means actuated upon the completion of said recording of said second data at said first position while said second frame number signal is being generated, thereby rewinding said film to bring said data recording means into opposite relation to a third position on said exposure frame, said third position and said second position being opposite to each other with said first position therebetween;

said data recording means causing said first data to be recorded at said third position after said rewinding of said film, whereby said second data recorded at said first position and said first data recorded at said third position are disposed in said exposure frame side by side in the feeding direction of said film.

8. A camera according to claim 1, wherein said film is accommodated in a Patrone and said film feeding by said feeding means is to wind up said film out of said Patrone.

9. A camera according to claim 1, wherein said film is accommodated in a Patrone and said film feeding by said feeding means is to rewind said film into said Patrone.

10. A camera according to claim 7, wherein said number of wound-up frames detecting means comprises means for counting the number of wound-up frames of said film having been wound up by said wind-up means, means for reading information on the number of all frames, indicative of how many pictures can be taken by said film loaded in said camera, from an information code provided on said film or said Patrone, and means for comparing said number of wound-up frames and said information on the number of all frames and the information on the number of wound-up frames, thereby generating said first frame number signal until the number of non-exposed frames is reduced to a predetermined number, and said second frame number signal after the number of non-exposed frames has been reduced to the predetermined value.

* * * * *